United States Patent
Wang et al.

(10) Patent No.: US 11,816,607 B2
(45) Date of Patent: Nov. 14, 2023

(54) APPARATUSES, COMPUTER-IMPLEMENTED METHODS, AND COMPUTER PROGRAM PRODUCTS FOR MANAGING A FEATURE EMPHASIS INTERFACE ELEMENT IN ASSOCIATION WITH A CARD-BASED COLLABORATIVE WORKFLOW MANAGEMENT SYSTEM

(71) Applicants: ATLASSIAN PTY LTD., Sydney (AU); ATLASSIAN, INC., San Francisco, CA (US)

(72) Inventors: Raymond Wang, Brooklyn, NY (US); Felix Haehnel, Chester, NJ (US)

(73) Assignees: ATLASSIAN PTY LTD., Sydney (AU); ATLASSIAN, INC., San Francisco, CA (US)

( * ) Notice: Subject to any disclaimer, the term of this patent is extended or adjusted under 35 U.S.C. 154(b) by 22 days.

(21) Appl. No.: 17/457,106

(22) Filed: Dec. 1, 2021

(65) Prior Publication Data
US 2023/0169419 A1    Jun. 1, 2023

(51) Int. Cl.
G06Q 10/0631 (2023.01)
H04L 12/18 (2006.01)
G06F 3/0483 (2013.01)

(52) U.S. Cl.
CPC ..... *G06Q 10/06311* (2013.01); *G06F 3/0483* (2013.01); *H04L 12/1813* (2013.01)

(58) Field of Classification Search
CPC ............ G06Q 10/06311; G06F 3/0483; H04L 12/1813
See application file for complete search history.

(56) References Cited

U.S. PATENT DOCUMENTS

| 11,455,601 B1* | 9/2022 | Hood | G06Q 10/105 |
| 2019/0394289 A1* | 12/2019 | Lehrian | H04L 67/306 |
| 2021/0133269 A1* | 5/2021 | Shah | G06F 3/147 |

OTHER PUBLICATIONS

Oracle Database Reference, "DBA_AUDIT_TRAIL", published at https://docs.oracle.com/cd/B19306_01/server.102/b14237/statviews_3056.htm#i1619732 and archived at archive.org as of Feb. 17, 2016 (Year: 2016).*

* cited by examiner

Primary Examiner — William A Beutel
(74) Attorney, Agent, or Firm — Alston & Bird LLP

(57) ABSTRACT

Methods, apparatuses, systems, and computer program products are disclosed for managing a feature emphasis interface element in association with a card-based collaborative workflow management system. In an example embodiment, an apparatus receives a feature status request, retrieves feature release data and user data, and determines a feature emphasis value based at least in part on the retrieved feature release data and user data. For each circumstance wherein the feature emphasis value satisfies a display feature threshold, the apparatus causes rendering of a feature emphasis interface element to a card-based collaborative workflow management user interface in association with a feature interface representation and for each circumstance wherein the feature emphasis value fails to satisfy the display feature threshold, cause rendering of the feature interface representation to the card-based collaborative workflow management user interface.

30 Claims, 9 Drawing Sheets

APPARATUSES, COMPUTER-IMPLEMENTED METHODS, AND COMPUTER PROGRAM PRODUCTS FOR MANAGING A FEATURE EMPHASIS INTERFACE ELEMENT IN ASSOCIATION WITH A CARD-BASED COLLABORATIVE WORKFLOW MANAGEMENT SYSTEM

BACKGROUND

Various methods, apparatuses, and systems provide tools for notifying or otherwise alerting users to various aspects of, and conditions in, collaborative workflow management systems. Applicant has identified a number of deficiencies and problems associated with efficiently and effectively conveying relevant feature or functionality status data to users without inundating users with alerts and notifications. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include improved apparatuses, methods, systems, and computer program products configured for rendering and effectively managing feature emphasis interface elements in association with a card-based collaborative workflow management system. In accordance with one exemplary embodiment of the present disclosure, an apparatus is configured to manage a feature emphasis interface element in association with a card-based collaborative workflow management system, the apparatus including at least one processor and at least one non-transitory memory, the at least one non-transitory memory having computer-coded instructions therein, wherein the computer-coded instructions are configured to, in execution with the at least one processor, cause the apparatus to receive a feature status request comprising a user identifier and one or more feature identifiers; retrieve feature release data associated with each of the one or more feature identifiers from a feature release data repository; retrieve user data associated with the user identifier from a user data repository, wherein the user data comprises at least a user system initiation timestamp and a user feature engagement value for each of the one or more feature identifiers; for each of the one or more feature identifiers, determine a feature emphasis value based at least in part on the user system initiation timestamp, a current timestamp, and the user feature engagement value; for each circumstance wherein the feature emphasis value satisfies a display feature threshold, cause rendering of a feature emphasis interface element to a card-based collaborative workflow management user interface in association with a feature interface representation corresponding to the feature identifier; and for each circumstance wherein the feature emphasis value fails to satisfy the display feature threshold, cause rendering of the feature interface representation corresponding to the feature identifier to the card-based collaborative workflow management user interface.

In some embodiments, the feature release data comprises a feature release threshold and a feature release expiration threshold for each feature of the one or more feature identifiers. In some further embodiments, determining a feature emphasis value for each of the one or more feature identifiers comprises determining whether the user system initiation timestamp satisfies the feature release threshold; determining whether the current timestamp satisfies the feature release expiration threshold; and determining whether the user feature engagement value satisfies a feature engagement threshold. In certain embodiments, the feature emphasis value satisfies the display feature threshold in an instance wherein the user system initiation timestamp satisfies the feature release threshold, the current timestamp satisfies the feature release expiration threshold, and the user feature engagement value satisfies the feature engagement threshold. In certain embodiments, the feature emphasis value fails to satisfy the display feature threshold in an instance wherein the user system initiation timestamp fails to satisfy the feature release threshold, the current timestamp fails to satisfy the feature release expiration threshold, and/or the user feature engagement value fails to satisfy the feature engagement threshold.

In some embodiments, the user system initiation timestamp satisfies the feature release threshold in an instance wherein the user system initiation timestamp antedates the feature release threshold. In some further embodiments, the user system initiation timestamp fails to satisfy the feature release threshold in an instance wherein the user system initiation timestamp postdates the feature release threshold.

In some embodiments, the current timestamp satisfies the feature release expiration threshold in an instance wherein the current timestamp antedates the feature release expiration threshold. In certain embodiments, the current timestamp fails to satisfy the feature release expiration threshold in an instance wherein the current timestamp postdates the feature release expiration threshold.

In some embodiments, the user feature engagement value satisfies the feature engagement threshold in an instance wherein a user activity data log documenting user engagement with the feature does not comprise a data entry identifying an explicit feature engagement signal stored in association with the feature identifier and the user identifier. IN certain embodiments, the user feature engagement value fails to satisfy the feature engagement threshold in an instance wherein a user activity data log documenting user engagement with the feature comprises at least one data entry identifying one or more explicit feature engagement signals stored in association with the feature identifier and the user identifier.

In some embodiments, the user feature engagement value satisfies the feature engagement threshold in an instance wherein a user activity data log documenting user engagement with the feature comprises at least one data entry identifying one or more implicit feature engagement signals stored in association with the feature identifier, the user identifier, and a session identifier associated with a current user session. In certain embodiments, the user feature engagement value fails to satisfy the feature engagement threshold in an instance wherein a user activity data log documenting user engagement with the feature comprises one or more implicit feature engagement signals stored in association with the feature identifier, the user identifier, and a session identifier, wherein the session identifier is associated with a user session that differs from a current user session.

In some embodiments, the computer-coded instructions are further configured to, in execution with the at least one processor, cause the apparatus to monitor user interaction with the card-based collaborative workflow management user interface; identify an explicit feature engagement signal, the explicit feature engagement signal comprising a first feature identifier of the one or more feature identifiers;

automatically update the card-based collaborative workflow management user interface to remove the feature emphasis interface element associated with the feature interface representation corresponding to the first feature identifier; and cause storage of an updated user feature engagement value associated with the user identifier and the first feature identifier in the user data repository. In some further embodiments, identifying the explicit feature engagement signal is triggered by user engagement of the feature emphasis interface element associated with the feature interface representation corresponding to the first feature identifier. In certain embodiments, identifying the explicit feature engagement signal is triggered by user engagement of the feature interface representation corresponding to the first feature identifier.

In some embodiments, the feature status request is associated with a display card-based collaborative workflow management user interface request.

In some embodiments, the display feature threshold is dynamically determined based on a machine learning model. In certain embodiments, the machine learning model is trained using at least historical feature resource data and a plurality of user activity data logs.

In accordance with another exemplary embodiment of the present disclosure, a computer-implemented method for managing a feature emphasis interface element in association with a card-based collaborative workflow management system includes receiving a feature status request comprising a user identifier and one or more feature identifiers; retrieving feature release data associated with each of the one or more feature identifiers from a feature release data repository; retrieving user data associated with the user identifier from a user data repository, wherein the user data comprises at least a user system initiation timestamp and a user feature engagement value for each of the one or more feature identifiers; for each of the one or more feature identifiers, determining a feature emphasis value based at least in part on the user system initiation timestamp, a current timestamp, and the user feature engagement value; for each instance wherein the feature emphasis value satisfies a display feature threshold, rendering a feature emphasis interface element to a card-based collaborative workflow management user interface in association with a feature interface representation corresponding to the feature identifier.

In some embodiments, the computer-implemented method further includes for each instance wherein the feature emphasis value fails to satisfy the display feature threshold, rendering the feature interface representation corresponding to the feature identifier to the card-based collaborative workflow management user interface.

In some embodiments, the feature release data comprises a feature release threshold and a feature release expiration threshold for each feature of the one or more feature identifiers. In still further embodiments, determining a feature emphasis value for each of the one or more feature identifiers includes determining whether the user system initiation timestamp satisfies the feature release threshold; determining whether the current timestamp satisfies the feature release expiration threshold; and determining whether the user feature engagement value satisfies a feature engagement threshold.

In some embodiments, the feature emphasis value satisfies the display feature threshold in an instance wherein the user system initiation timestamp satisfies the feature release threshold, the current timestamp satisfies the feature release expiration threshold, and the user feature engagement value satisfies the feature engagement threshold.

In some further embodiments, the feature emphasis value fails to satisfy the display feature threshold in an instance wherein the user system initiation timestamp fails to satisfy the feature release threshold, the current timestamp fails to satisfy the feature release expiration threshold, and/or the user feature engagement value fails to satisfy the feature engagement threshold.

In certain embodiments, the user system initiation timestamp satisfies the feature release threshold in an instance wherein the user system initiation timestamp antedates the feature release threshold. In some further embodiments, the user system initiation timestamp fails to satisfy the feature release threshold in an instance wherein the user system initiation timestamp postdates the feature release threshold.

In some embodiments, the current timestamp satisfies the feature release expiration threshold in an instance wherein the current timestamp antedates the feature release expiration threshold. In some further embodiments, the current timestamp fails to satisfy the feature release expiration threshold in an instance wherein the current timestamp postdates the feature release expiration threshold.

In some embodiments, the user feature engagement value satisfies the feature engagement threshold in an instance wherein a user activity data log documenting user engagement with the feature does not comprise a data entry identifying an explicit feature engagement signal stored in association with the feature identifier and the user identifier. In some further embodiments, the user feature engagement value fails to satisfy the feature engagement threshold in an instance wherein a user activity data log documenting user engagement with the feature comprises at least one data entry identifying one or more explicit feature engagement signals stored in association with the feature identifier and the user identifier.

In some embodiments, the user feature engagement value satisfies the feature engagement threshold in an instance wherein a user activity data log documenting user engagement with the feature comprises at least one data entry identifying one or more implicit feature engagement signals stored in association with the feature identifier, the user identifier, and a session identifier associated with a current user session. In certain embodiments, the user feature engagement value fails to satisfy the feature engagement threshold in an instance wherein a user activity data log documenting user engagement with the feature comprises one or more implicit feature engagement signals stored in association with the feature identifier, the user identifier, and a session identifier, wherein the session identifier is associated with a user session that differs from a current user session.

In some embodiments, the computer-implemented method further includes monitoring user interaction with the card-based collaborative workflow management user interface; identifying an explicit feature engagement signal, the explicit feature engagement signal comprising a first feature identifier of the one or more feature identifiers; automatically updating the card-based collaborative workflow management user interface to remove the feature emphasis interface element associated with the feature interface representation corresponding to the first feature identifier; and storing an updated user feature engagement value associated with the user identifier and the first feature identifier in the user data repository In some embodiments, identifying the explicit feature engagement signal is triggered by user engagement of the feature emphasis interface element associated with the feature interface representation corresponding to the first feature identifier. In still further embodiments, identifying the explicit feature engagement signal is triggered by user engagement of the feature interface representation corresponding to the first feature identifier.

In some embodiments, the feature status request is associated with a display card-based collaborative workflow management user interface request.

In some embodiments, the display feature threshold is dynamically determined based on a machine learning model. In certain embodiments, the machine learning model is trained using at least historical feature resource data and a plurality of user activity data logs.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1:
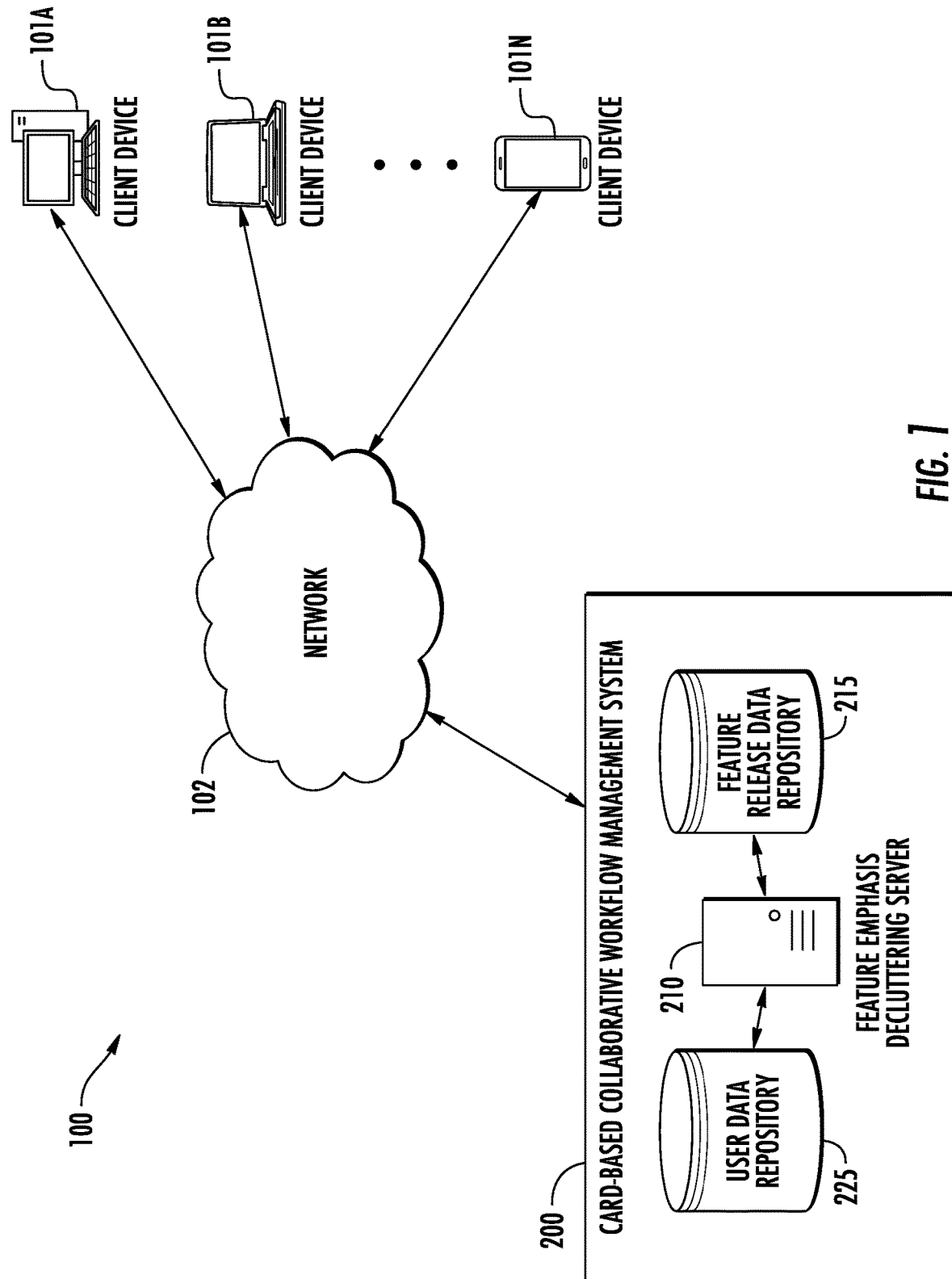
Figure 2:
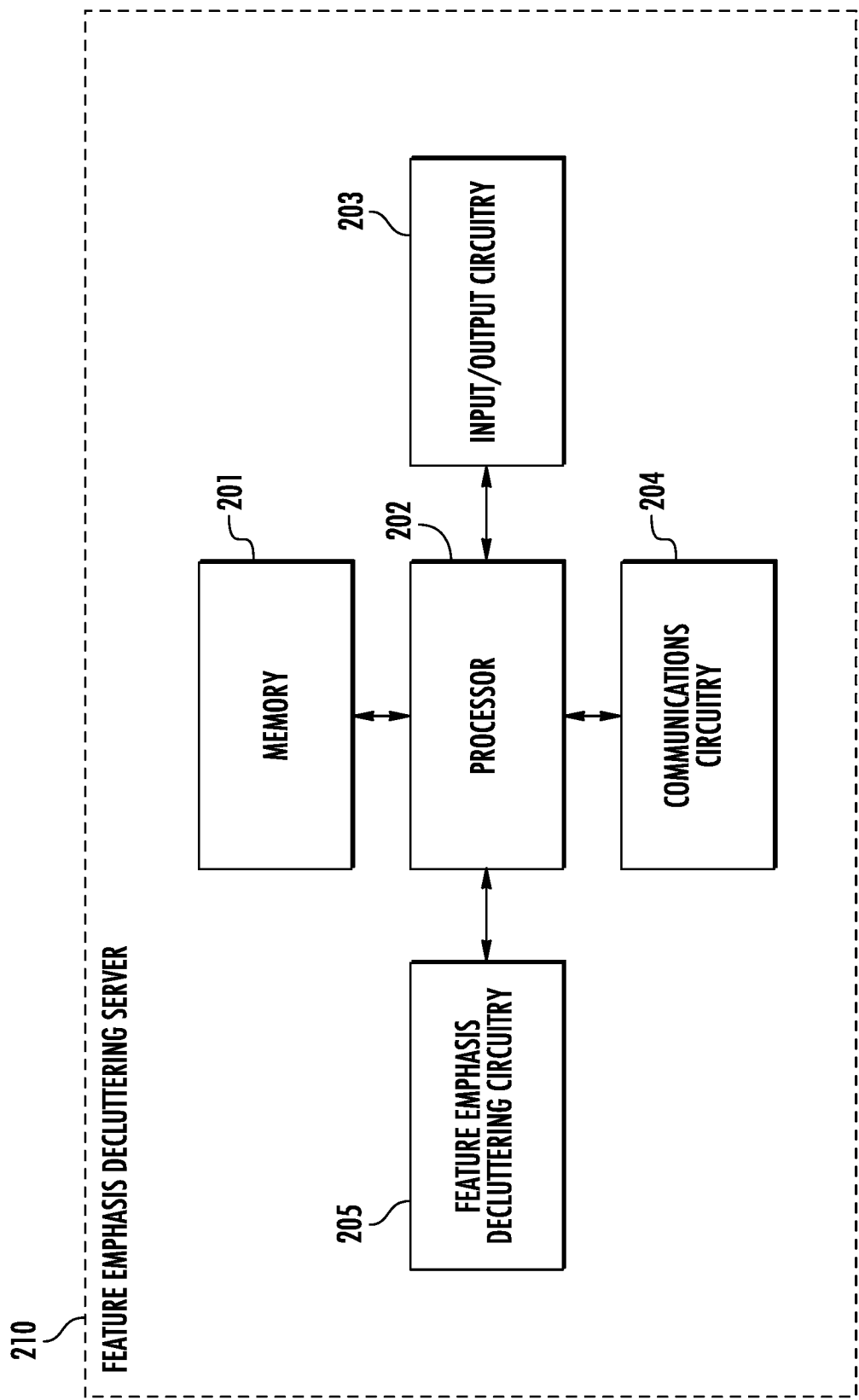
Figure 3A:
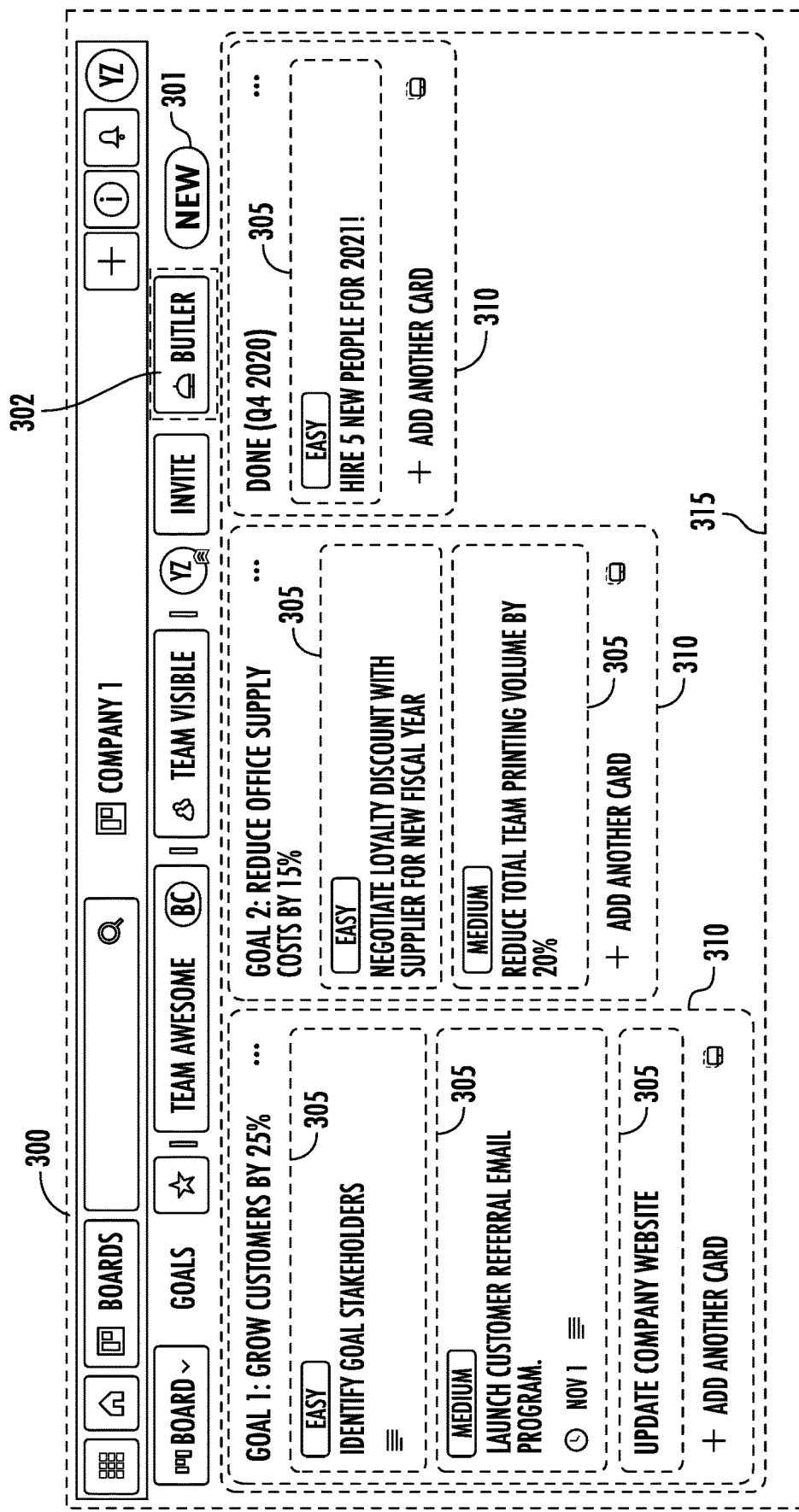
Figure 3B:
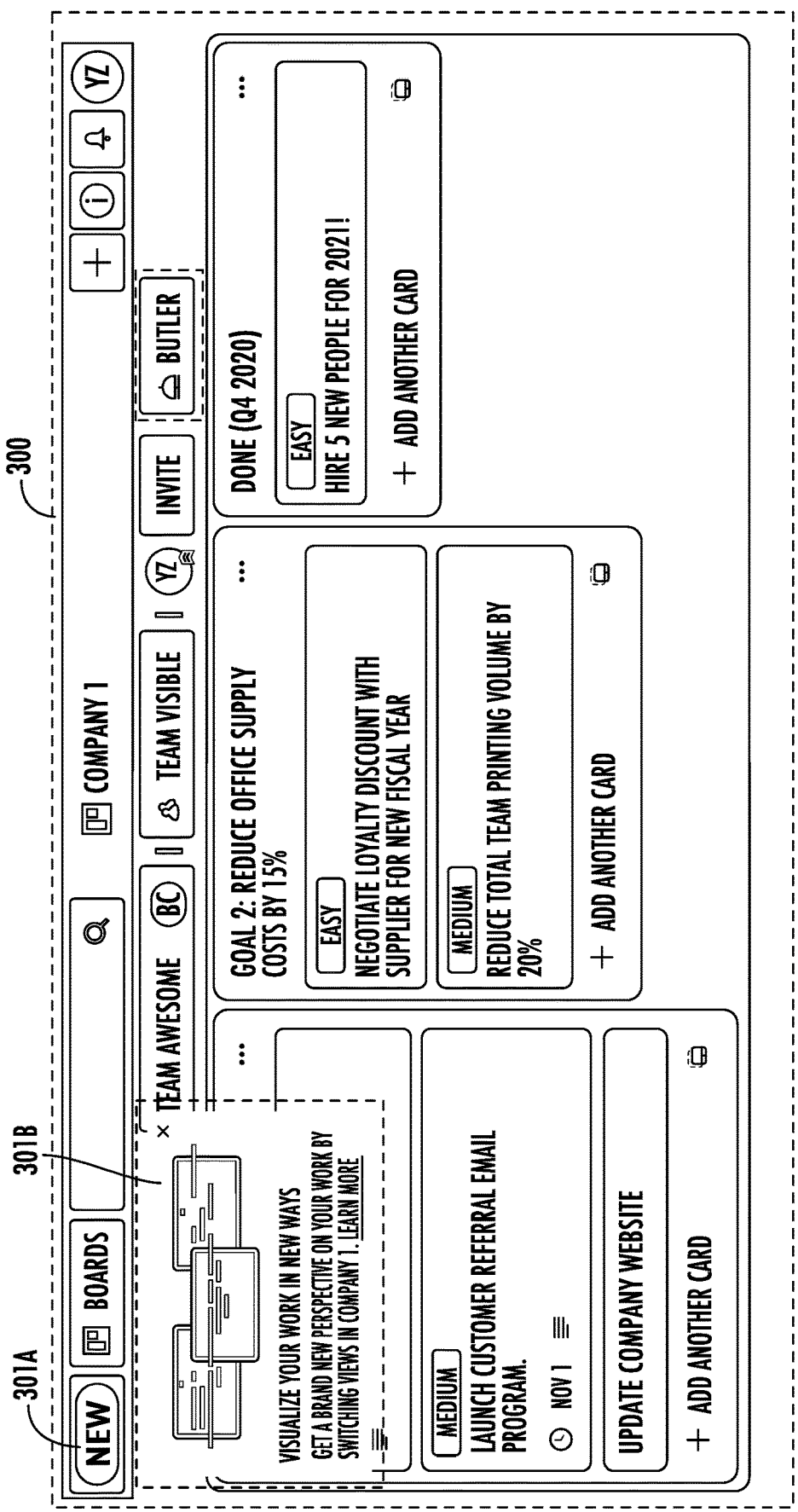
Figure 3C:
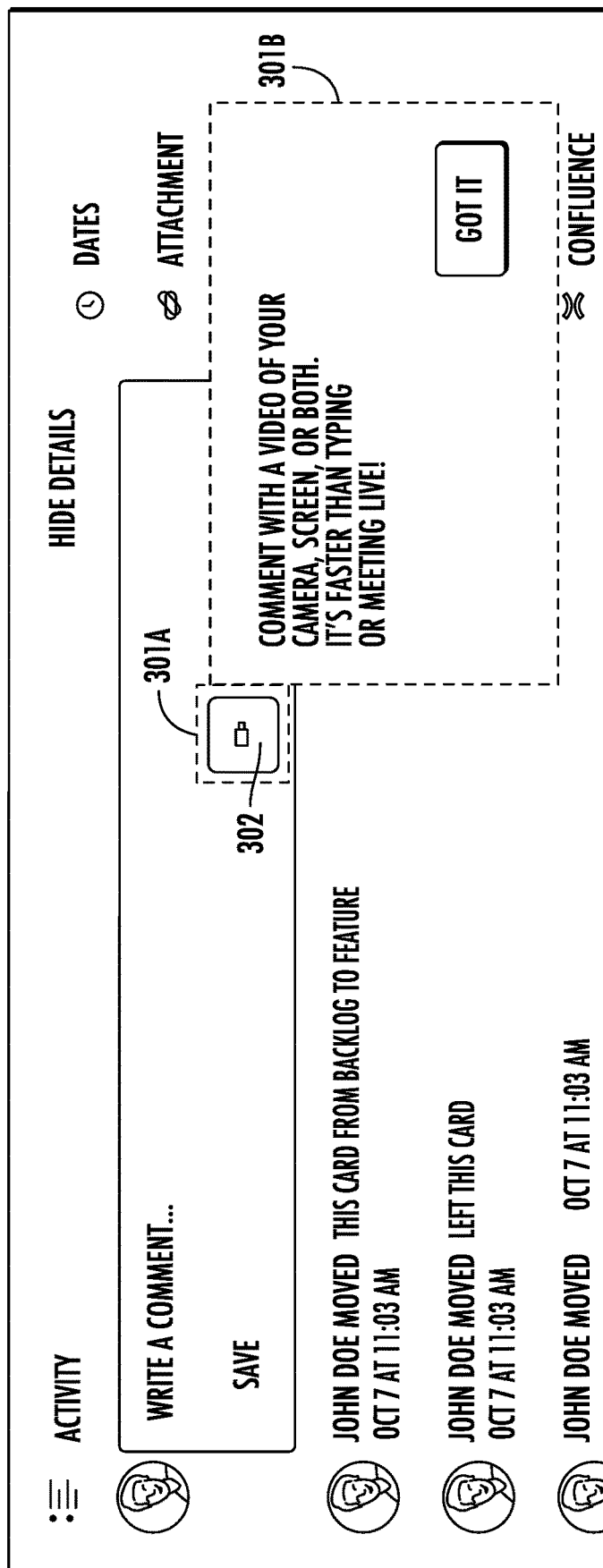
Figure 3D:
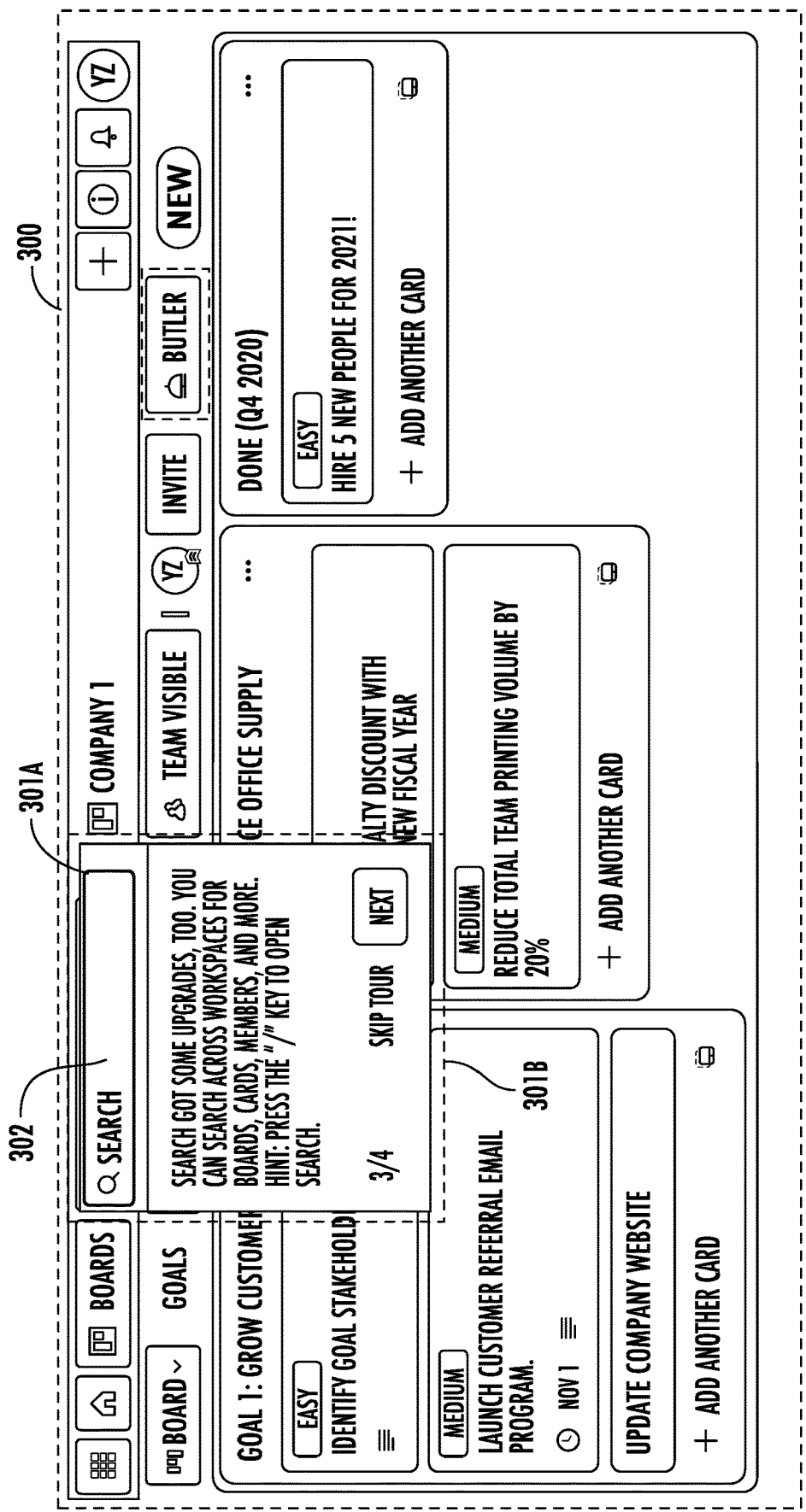
Figure 4A:
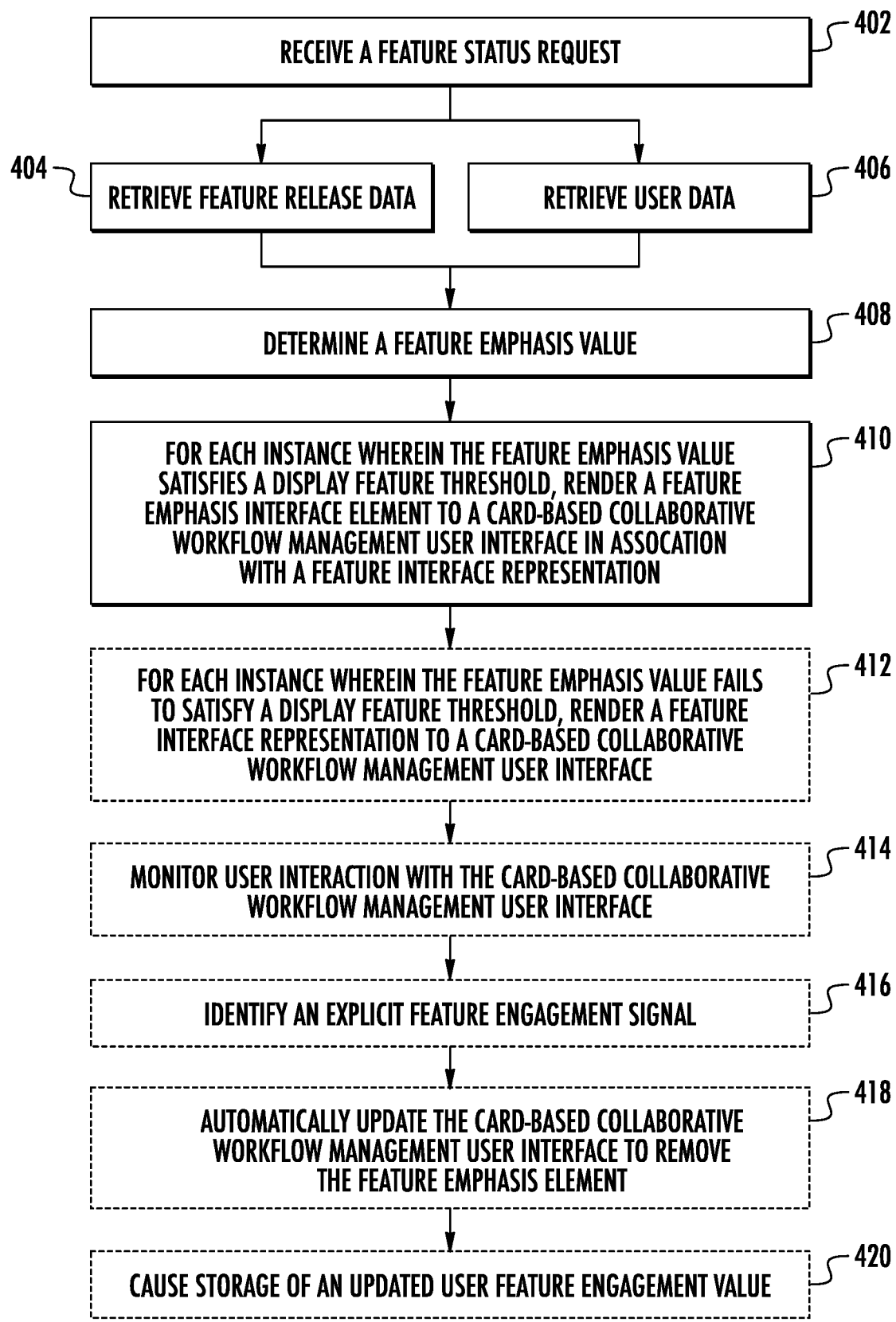
Figure 4B:
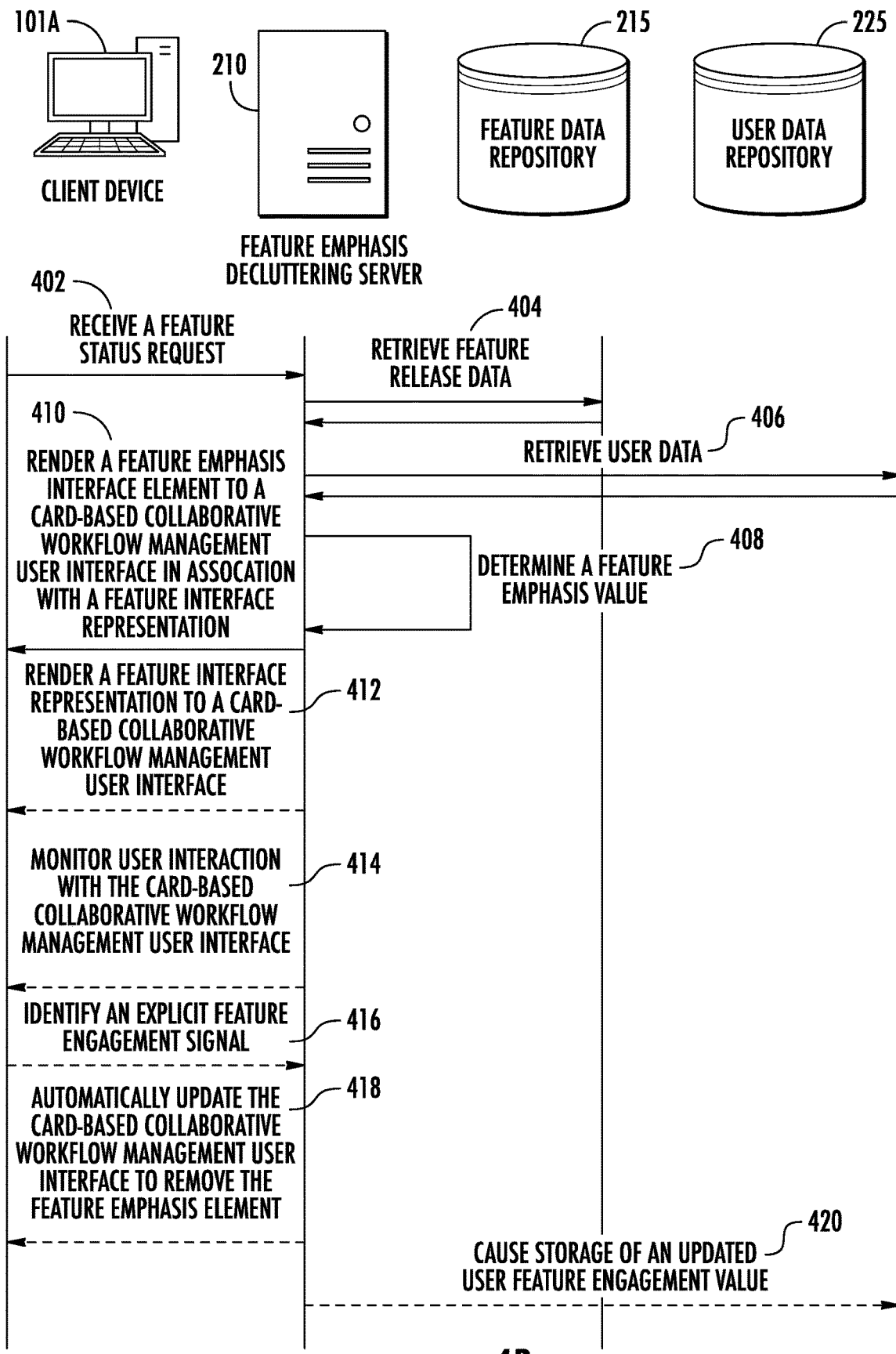
Figure 5:
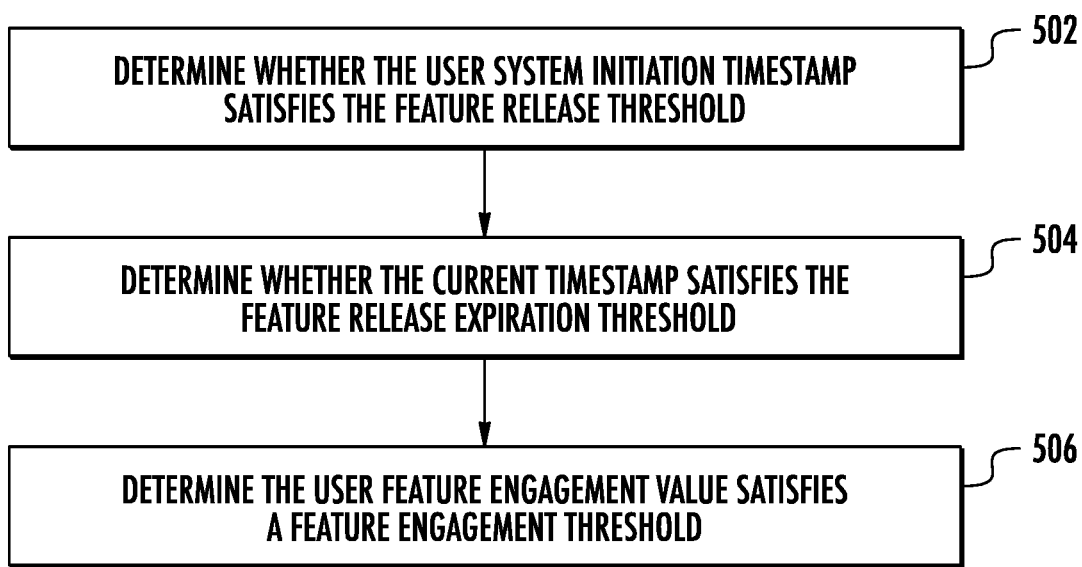

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings:

FIG. 1 illustrates an example card-based collaborative workflow management system configured to communicate with one or more client devices in accordance with some example embodiments described herein;

FIG. 2 is a schematic block diagram of example circuitry for use in a client device in accordance with some example embodiments described herein;

FIG. 3A illustrates an example feature emphasis interface element associated with a card-based collaborative workflow management user interface, the feature emphasis interface element structured in accordance with some example embodiments described herein;

FIG. 3B illustrates another example feature emphasis interface element associated with a card-based collaborative workflow management user interface, the feature emphasis interface element structured in accordance with some example embodiments described herein;

FIG. 3C illustrates another example feature emphasis interface element associated with a card-based collaborative workflow management user interface, the feature emphasis interface element structured in accordance with some example embodiments described herein;

FIG. 3D illustrates another example feature emphasis interface element associated with a card-based collaborative workflow management user interface, the feature emphasis interface element structured in accordance with some example embodiments described herein;

FIG. 4A is a flowchart illustrating example operations for managing a feature emphasis interface element in association with a card-based collaborative workflow management system in accordance with some example embodiments described herein;

FIG. 4B is a signal diagram of an example data flow in accordance with some example embodiments described herein; and FIG. 5 is a flowchart illustrating example operations for determining a feature emphasis value with respect to each of the one or more feature identifiers in association with a card-based collaborative workflow management system in accordance with some example embodiments described herein.

DETAILED DESCRIPTION

One or more embodiments now will be more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements. As used herein, the description may refer to an example "apparatus." However, elements of the apparatus described herein may be equally applicable to the claimed system, method, and computer program product. Accordingly, use of any such terms should not be taken to limit the spirit and scope of embodiments of the present disclosure.

Overview

Various embodiments of the present disclosure relate generally to managing a feature emphasis interface element in order to expose selected feature status information to users based on a situational awareness of each user with respect to each feature in a card-based collaborative workflow management system. For example, in the instance of a new user or new member of a card-based collaborative workflow management system, practically every feature, functionality, and experience in such card-based collaborative workflow management system is "new". It is undesirable to inundate the user interface associated with such user with excessive notifications of new or updated feature releases as such absolute, generic, or unconditional presentation of notifications and/or feature status information simply clutters the user interface, overwhelming a new user as well as annoying an existing member of the card-based collaborative workflow management system. That is, in the instance of a new user, it is counter-intuitive to display "new" feature status information with respect to each "new" feature as a majority, if not all, of the features would be "new" to such user, resulting in a cluttered display of simultaneous "new" notifications. In the instance of an existing member, it is undesirable to reduce the significance of notifications of recent feature releases and/or different/change/updates to existing features by overwhelming the user interface with irrelevant "new" features or, in the alternative, to simply not provide such feature status information. Accordingly, the inventors have determined it would be desirable and advantageous to be able to selectively surface information, such as feature status information, user education, spotlights, and the like to disparate user profiles based on a situational and/or contextual awareness of each user with respect to each feature in the card-based collaborative workflow management system in order to maintain effectiveness and significance of such feature status information or notifications.

Example embodiments of the present disclosure may overcome the above-referenced challenges. From the user experience perspective, feature emphasis interface elements and feature emphasis decluttering servers structured in accordance with various embodiments of the present disclosure increase usability of card-based collaborative workflow management system by decluttering excessive, irrelevant, and/or distractive feature status information from the user interface and selectively raising awareness to certain features by displaying contextually relevant and contemporary feature status information. Advantageously, and in some examples, the feature emphasis interface element that is generated and/or caused to be rendered by the methods, apparatus, and computer program products described herein, is tailorable to the user (e.g., based on user experience, context, and/or the like).

Applicant has identified that methods, apparatus, systems, and computer program products structured in accordance with certain embodiments of the present disclosure provide techniques for managing a feature emphasis interface element in association with the card-based collaborative workflow management system, thereby surfacing a feature to a greater level of attention or exposure to certain users compared to other features and/or users. In some embodiments of the present disclosure, such techniques include retrieving feature release data and user data in response to receiving a feature status request, determining a feature emphasis value based on such data, and causing rendering of a feature emphasis interface element to a card-based collaborative workflow management user interface in association with a feature interface representation when a feature emphasis value satisfies a display feature threshold and/or causing rendering of a feature interface representation to a card-based collaborative workflow management user interface when a feature emphasis value fails to satisfy a display feature threshold. By taking into account the individual context of the user with respect to the card-based collaborative workflow management system and the individual feature(s), the feature emphasis interface element provides a customizable and appropriate level of exposure of feature status information to the user, thereby avoiding and/or reducing the presentation of an overwhelming number of irrelevant alerts, prompts, conditions, and notifications. By facilitating effective communication of meaningful, relevant, and/or new features, the methods, apparatus, systems, and computer program products structured in accordance with certain embodiments of the present disclosure strike a balance between surfacing new features to users and avoiding information overload. Additionally or alternatively, in some embodiments of the present disclosure, once the user engages with the feature via one or more specified interactions, the feature emphasis decluttering server updates the card-based collaborative workflow management user interface to remove and/or stop rendering the feature emphasis interface element, thereby ensuring continued effective communication of relevant feature status information.

Additionally or alternatively still, some example embodiments of the present disclosure provide techniques for identifying, analyzing, and/or accounting for various feature dependencies between features and/or releases in the card-based collaborative workflow management system. For example, based on at least a feature dependency indicator, a feature emphasis decluttering server of the present disclosure may determine that one or more features, functionalities, releases, and/or other experiences should not be associated with a feature emphasis interface element and/or even rendered as a feature interface representation to the card-based collaborative workflow management user interface while a feature emphasis value associated with a selected feature satisfies or continues to satisfy a display feature threshold.

In a non-limiting contextual example, a secondary feature of a card-based collaborative workflow management system may not be displayed to the card-based collaborative workflow management user interface while a selected primary feature is still "new" to the user.

Additionally or alternatively still, some example embodiments of the present disclosure programmatically monitor, track, and/or analyze feature discovery events and metrics associated with user experiences, such as a user's interaction with feature interface representations and/or feature emphasis interface elements, so as to effectively inform the determination of an appropriate dynamic exposure level to relevant feature status information. For example, in some embodiments, a feature emphasis decluttering server of the present disclosure may capture such feature discovery events and metrics associated with a plurality of users to holistically determine whether users are over-inundated with features. That is, the inventors have further determined that because the varied data inputted and outputted in the card-based collaborative workflow management environment (e.g., various captured engagement signals, for a variety of features, by an ever-increasing user membership with differing onboarding dates to the system) is not necessarily comparable as well as being extensive, it would be advantageous to leverage artificial intelligence and train a machine learning model with such a dissimilar user activity and feature release data in order to determine feature discovery events, metrics, and the like, the machine learning model thereby effectively informing the feature emphasis decluttering server to dynamically determine an appropriate exposure level to relevant status information.

The various implementations of the feature emphasis interface elements and the feature emphasis decluttering servers of the present disclosure are not limited to selectively emphasizing status information associated with a feature, functionality, or other experience to a user in a card-based collaborative workflow management system and can instead be configured to selectively display or expose a wide variety of data that might be of interest to a user. The feature emphasis interface element and feature emphasis decluttering server may be used to selectively expose any type of data for any purpose and it may be used in connection with numerous exemplary system architectures as explained in further detail herein. One of ordinary skill in the art will appreciate that the feature emphasis interface element, feature emphasis decluttering server, and related concepts discussed herein may be applied to selectively surface and expose users to potentially relevant data from a wide variety of sources.

Definitions

As used herein, the term "card-based collaborative workflow management system" refers to a software platform(s)

and associated hardware that is configured to support, maintain, and manage a plurality of project(s), task(s), workflow(s), and all associated functionality, including collaboration among users, via card data object(s), list data objects, and/or board data object(s). For example, in some embodiments, a card data object represents one or more tasks associated with a team or group of people. In some embodiments, one or more card data objects are associated with a list data object, which represents a list of tasks associated with the team or group of people. In still further embodiments, one or more card data objects and/or one or more list data objects are associated with a board data object such that the board data object is an organized set of the one or more list data objects and/or the one or more card data objects. For example, in some embodiments, a board data object corresponds to and/or represents a project and each card data object and/or list data object associated with the board data object represents a subset of tasks associated with such project. As such, the card-based collaborative workflow management system allows a group of people to manage various tasks based at least in part on one or more card data objects, one or more list data objects, and/or one or more board data objects, renderings of which are displayed to a card-based collaborative workflow management user interface on client devices associated with the group of people. Example card-based collaborative workflow management systems comprise supporting server(s), repositor(ies), and client device(s), and in some embodiments, are further configured to engage with external resource(s) and external application(s).

The term "card-based collaborative workflow management user interface" refers to a graphical user interface or sub-user interface of a card-based collaborative workflow management system that is configured to enable users to view, access, review, modify, edit and/or otherwise engage with the card-based collaborative workflow management system. A card-based collaborative workflow management user interface is rendered to a client device based on data and instructions provided by the card-based collaborative workflow management system (e.g., feature emphasis decluttering server). In some embodiments, such data and instructions are facilitated by a dedicated software application running on the client device. In other embodiments, such data and instructions are provided through a web browser running on the client device. For example, the card-based collaborative workflow management user interface 300 of FIG. 3A is an example of a card-based collaborative workflow management user interface.

The term "card-based collaborative workflow management user interface request" refers to an electrically generated digital object that is created by or otherwise originates from a computing device associated with a user identifier requesting generation and output of a card-based collaborative workflow management user interface with respect to the particular user. In this regard, a card-based collaborative workflow management user interface request causes initiation of a process that may culminate in rendering a card-based collaborative workflow management user interface. In some embodiments, a card-based collaborative workflow management user interface request is represented via a temporary code that is generated by and/or transmitted from a computing device (e.g., based on user interaction with a client device) to a management system (e.g., card-based collaborative workflow management system) as an indication that a client device has made the request. In some embodiments, the card-based collaborative workflow management user interface request is associated with a variety of metadata such as one or more of a user identifier, a feature identifier, and/or other data for use in generating, managing, and/or otherwise supporting a card-based collaborative workflow management system as described herein. In some embodiments, a card-based collaborative workflow management user interface request is associated with one or more feature status request(s) and/or one or more display feature interface representation request(s).

The term "feature emphasis decluttering server" refers to a software platform and associated hardware that is configured to manage one or more feature emphasis interface element(s) in association with card-based collaborative workflow management system. The feature emphasis decluttering server is accessible via one or more computing devices and is configured to, inter alia, monitor user interaction with a card-based collaborative workflow management user interface, receive feature status requests, identify one or more feature engagement signals, determine one or more feature emphasis values, cause rendering of and/or update (e.g., remove rendering of) one or more feature emphasis interface elements, and access one or more data repositories, such as a user data repository and/or a feature release data repository. The functionality of the feature emphasis decluttering server may be provided via a single server or a collection of servers having a common functionality, or the functionality of the feature emphasis decluttering server may be segmented among a plurality of servers or collections of servers performing subsets of the described functionality of the feature emphasis decluttering server, such as in a cloud networking environment.

The term "feature identifier" refers to one or more items of data by which a feature may be identified within a card-based collaborative workflow management system. For example, a feature identifier may comprise text string(s), numerical character(s), alphabetical character(s), alphanumeric code(s), ASCII character(s), a pointer, an IP address, a MAC address, a memory address, other unique identifier, or a combination thereof.

The term "feature interface representation" refers to a renderable interface component rendered to a card-based collaborative workflow management user interface configured to visually depict a feature of the card-based collaborative workflow management system. For example, the feature interface representation 302 of FIG. 3A is an example of a feature interface representation.

The term "feature emphasis interface element" refers to a visual representation that is rendered to, or as a portion of, a card-based collaborative workflow management user interface in a card-based collaborative workflow management system and is configured to visually convey or depict to a user emphasis information associated with a feature of the card-based collaborative workflow management system. For example, in some embodiments, a feature emphasis interface element visually conveys to the user a satisfaction of the display feature threshold by a feature emphasis value determined specifically for the user with respect to the feature. To provide context, a feature emphasis value may be determined using various embodiments described herein, such as retrieval and analysis of a user system initiation timestamp, a current timestamp, and a user feature engagement value. The feature emphasis interface elements 301 of FIGS. 3A, 3B, and 3C are non-limiting examples of a feature emphasis interface element.

The term "feature status request" refers to an electrically generated digital object that is created by or otherwise originates from a computing device requesting a status of a feature with respect to a particular user. In some embodiments, a feature status request is transmitted with and/or received in association with a display feature interface representation request and/or a card-based collaborative workflow management user interface request. In this regard, a feature status request causes initiation of a process that may culminate in rendering or updating the rendering of a feature emphasis interface element to a card-based collaborative workflow management user interface. In some embodiments, a feature status request is represented via a temporary code that is generated by and/or transmitted from a computing device (e.g., client device) to a card-based collaborative workflow management system (e.g., feature emphasis decluttering server) as an indication that a client device has made the request. In some embodiments, the feature status request is associated with a variety of metadata such as one or more of a user identifier, a feature identifier, a session identifier, and/or other data for use in managing or otherwise supporting a feature emphasis interface element as described herein.

The term "feature emphasis value" refers to a value programmatically generated and/or determined by a feature emphasis decluttering server based at least in part on an analysis of one or more of a user system initiation timestamp, a current timestamp, and a user feature engagement value associated with user with respect to a particular feature. In some embodiments, the feature emphasis decluttering server causes storage of the feature emphasis value in a repository, such as user data repository and/or feature release data repository.

The term "display feature threshold" refers to a parameter, condition, value, or the like that defines criteria that must be satisfied, achieved, present, and/or met with respect to a particular feature identifier in order for a corresponding feature emphasis interface element to be rendered to a card-based collaborative workflow management user interface. In some embodiments, the display feature threshold is determined and/or defined by a feature emphasis decluttering server and stored in a repository, such as a user data repository and/or feature release data repository.

The term "feature release data" refers to one or more items of data related to a feature released or to be release within a card-based collaborative workflow management system, including but not limited to, feature identifier, feature release threshold, and feature release expiration threshold.

The term "feature release data repository" refers to a location, such as a database stored on a memory device, which is accessible by one or more computing devices for retrieval and storage of feature release data and other data associated with feature emphasis interface elements. For example, the feature release data repository includes one or more of user identifiers, feature identifiers, feature dependency indicators, feature discovery events, feature release thresholds, feature release expiration thresholds, user activity data logs, and/or the like. The feature release data repository may be a dedicated device and/or a part of a larger repository. The feature release data repository may be dynamically updated or be static. In some embodiments, the feature release data repository is encrypted in order to limit unauthorized access of such feature release data.

The term "feature release threshold" refers to a parameter, condition, value, or the like that defines user system initiation timestamp criteria that must be satisfied, achieved, present, and/or met with respect to a feature identifier for a particular user identifier. For example, in some embodiments, a feature emphasis decluttering server determines whether a user system initiation timestamp associated with a user identifier satisfies a feature release threshold associated with the feature identifier. In a non-limiting example, a feature release threshold is the timestamp associated with the initial release, publication, and/or accessibility of a feature to a user or group of users. In some embodiments, the feature release threshold is determined and/or defined by a feature emphasis decluttering server. In other embodiments, a feature release threshold is defined by a feature administrator or developer associated with the selected feature. In some embodiments, a feature release threshold is stored in association with its corresponding feature identifier in a repository, such as a feature release data repository.

The term "feature release expiration threshold" refers to a parameter, condition, value, or the like that defines current timestamp criteria that must be satisfied, achieved, present, and/or met with respect to a feature identifier. For example, in some embodiments, a feature emphasis decluttering server determines whether a current timestamp satisfies a feature release expiration threshold associated with the feature identifier. In a non-limiting example, a feature release expiration threshold is the timestamp associated with and/or assigned to the predetermined removal or non-rendering of the feature emphasis interface element to a card-based collaborative workflow management user interface associated with a feature. In some embodiments, the feature release expiration threshold is determined and/or defined by a feature emphasis decluttering server. In other embodiments, a feature release expiration threshold is defined by a feature administrator or developer associated with the selected feature. In some embodiments, a feature release expiration threshold is stored in association with its corresponding feature identifier in a repository, such as a feature release data repository.

The term "feature engagement threshold" refers to a parameter, condition, value, or the like that defines user engagement criteria with respect to a feature identifier that must be satisfied, achieved, present, and/or met. For example, in some embodiments, a feature emphasis decluttering server determines whether a user feature engagement value associated with a selected feature identifier and user identifier satisfies a feature engagement threshold associated with the feature identifier as part of a determination of whether a feature emphasis interface element should be rendered to the particular user in association with a selected feature identifier. In some embodiments, the feature engagement threshold is determined and/or defined by a feature emphasis decluttering server. In other embodiments, a feature engagement threshold is defined by a feature administrator or developer associated with the selected feature. In some embodiments, a feature engagement threshold is stored in association with its corresponding feature identifier in a repository, such as a feature release data repository.

The term "explicit feature engagement signal" refers to an electronic indication that a user (e.g., via a client device) has directly interacted with, selected, and/or engaged with a feature interface representation and/or a feature emphasis interface element on a visual display of the client device. For example, in some embodiments, a feature emphasis interface element includes one or more selectable buttons enabling the user to explicitly or expressly indicate that the user has seen the feature (e.g., the "Learn more" link depicted in the secondary feature emphasis interface element 301B of FIG. 3B, the "Got it" button depicted in the secondary feature emphasis interface element 301B of FIG. 3C, the "Next: button depicted in the secondary feature emphasis interface element 301B in FIG. 3D). In some embodiments, an explicit feature engagement signal is represented via a temporary code that is generated by and/or transmitted from a computing device (e.g., client device) to a card-based collaborative workflow management system (e.g., feature emphasis decluttering server). In some embodiments, one or more explicit feature engagement signals are stored in a user activity data log (e.g., in a user data repository and/or a feature release data repository) in association with a corresponding feature identifier and the user identifier associated with the engagement signal. In certain embodiments, the explicit feature engagement signal is associated with a variety of metadata, including without limitation, one or more of a user identifier, a feature identifier, the amount of time spent by the user interacting with and/or engaging particular content (e.g., the feature interface representation and/or feature emphasis interface element) via the client device, a timestamp or timestamp range associated with when such content was accessed, and/or the like.

The term "implicit feature engagement signal" refers to an electronic indication that a user (e.g., via a client device) has viewed and/or scrolled over a feature interface representation and/or a feature emphasis interface element on a visual display of the client device without explicit, express, or direct engagement of the feature interface representation and/or the feature emphasis interface element. In some embodiments, an implicit feature engagement signal is represented via a temporary code that is generated by and/or transmitted from a computing device (e.g., client device) to a card-based collaborative workflow management system (e.g., feature emphasis decluttering server). In some embodiments, one or more implicit feature engagement signals are stored in a user activity data log (e.g., in a user data repository and/or a feature release data repository) in association with a corresponding feature identifier, the user identifier, and a session identifier. In certain embodiments, the implicit feature engagement signal is associated with a variety of metadata, including without limitation, one or more of a user identifier, a feature identifier, session identifier, mouse-over events and durations, the amount of time spent by the client device viewing and/or displaying particular content (e.g., the feature interface representation and/or feature emphasis interface element), a timestamp or timestamp range associated with when such content was accessed, and/or the like.

The term "session identifier" refers to information and/or data that uniquely identifies a particular user session or application instance in the card-based collaborative workflow management system. In some embodiments, a user accesses a card-based collaborative workflow management system via a user session established and/or authenticated with the card-based collaborative workflow management system. In some embodiments, a user session is defined by an initiation of the user session and a termination of the user session. In some embodiments, a user may access the card-based collaborative workflow management system via one or more user sessions, each user session assigned a different session identifier. For example, in a non-limiting example, in an instance wherein a user accesses the card-based collaborative workflow management system via two browser tabs or sessions, each user session is assigned a different session identifier. A session identifier may comprise text string(s), numerical character(s), alphabetical character(s), alphanumeric code(s), ASCII character(s), a pointer, an IP address, a MAC address, a memory address, other unique identifier, or a combination thereof.

The term "user activity data log" refers to structured data that is generated by the feature emphasis decluttering server and, in some embodiments, is stored to a repository, such as a user data repository and/or a feature release data repository. The user activity data log documents engagement by a user with one or more features of a card-based collaborative workflow management system. Example user activity data logs include user engagement data that tracks or embodies implicit and/or explicit engagement by a user. For example, in some embodiments, the user activity data log includes one or more of user identifier(s), feature identifier(s), session identifier(s), feature engagement signals (e.g., explicit feature engagement signal(s), implicit feature engagement signal(s) and the like), timestamp(s), and the like.

For example, in some embodiments, user engagement with a feature emphasis interface element rendered to a card-based collaborative workflow management user interface in association with a feature interface representation of a feature identifier generates an explicit feature engagement signal associated with the corresponding feature identifier and the user identifier. The feature emphasis decluttering server generates, maintains, and/or updates a user activity data log to include such explicit feature engagement signal in association with the selected feature identifier and the user identifier. In another example, user engagement with a feature interface representation rendered to a card-based collaborative workflow management user interface in association with a feature emphasis interface element generates an explicit feature engagement signal associated with the corresponding feature identifier and the user identifier. The feature emphasis decluttering server generates, maintains, and/or updates a user activity data log to include such explicit feature engagement signal in association with the selected feature identifier and the user identifier. In still another example, the feature emphasis decluttering server generates, maintains, and/or updates a user activity data log to include an implicit feature engagement signal associated with a feature identifier and user identifier in an instance wherein the feature emphasis interface element and/or the feature interface representation of a feature identifier are rendered to a card-based collaborative workflow management user interface such that it continues to be viewable to a user during the current session. The user activity data log can be analyzed by the feature emphasis decluttering server to determine a user feature engagement value associated with the user identifier for a selected feature identifier.

In some embodiments, the feature emphasis decluttering server utilizes such user activity data logs to monitor, track, and/or analyze feature discovery events and metrics associated with user experiences (e.g., based on the various engagement signals associated with the feature identifiers) to effectively inform a programmatic determination of an appropriate dynamic exposure level to relevant feature status information. For example, in some embodiments, a feature emphasis decluttering server of the present disclosure may capture such feature discovery events and metrics associated with a plurality of users to holistically determine whether users are over-inundated with features.

The term "user data" refers to a collection of data associated with a user that is capable of being transmitted, received, and/or stored. In some embodiments, user data comprises data associated with a user which defines and/or identifies the user within a card-based collaborative workflow management system. For example, user data may comprise one or more of a user identifier, user profile data, user system initiation timestamp, and/or the like. The user data can include a subset designation of user credentials, such as, for example, login information for the user for the card-based collaborative workflow management system including the user's username and password. In some embodiments, user data comprises feature data associated with a user with respect to particular features. For example, user data may comprise one or more of a feature identifier, a user feature engagement value, user activity data log, explicit feature engagement signals, implicit feature engagement signals, and/or the like. In certain embodiments, user data is stored in a user data repository.

The term "user identifier" refers to one or more items of data by which a user may be identified within a card-based collaborative workflow management system. For example, a user identifier may comprise text string(s), numerical character(s), alphabetical character(s), alphanumeric code(s), ASCII character(s), a pointer, an IP address, a MAC address, a memory address, other unique identifier, or a combination thereof.

The term "user data repository" refers to a location, such as a database stored on a memory device, which is accessible by one or more computing devices for retrieval and storage of user data and other data associated with feature emphasis interface elements. For example, the user data repository includes one or more of user identifiers, feature identifiers, user profile data, user credentials, user system initiation timestamps, user feature engagement values, engagement signals (e.g., explicit feature engagement signals and implicit feature engagement signals), user activity data logs, and/or the like. The user data repository may be a dedicated device and/or a part of a larger repository. The user data repository may be dynamically updated or be static. In some embodiments, the user data repository is encrypted in order to limit unauthorized access of such user data.

The term "user engagement" refers to user interaction, via a graphical user interface, with the card-based collaborative workflow management user interface or components thereof. Such user engagement with the card-based collaborative workflow management user interface or components thereof can be via a multitude of interactions, such as, but not limited to, "non-keystroke engagement" or "keystroke engagement." Non-keystroke engagement refers to user interaction in which such user interaction is free from (i.e., excludes) the entering of one or more (e.g., keystroke) characters into a card-based collaborative workflow management user interface. For example, touch-screen or mouse click engagement are examples of non-keystroke engagement. The term "keystroke engagement" refers to entering of one or more keystrokes into a component of the card-based collaborative workflow management user interface. For example, input of one or more characters (e.g., alphanumeric characters or emojis) into a component of the card-based collaborative workflow management user interface is one example of keystroke engagement.

The term "user feature engagement value" refers to determination of user interaction by a particular user with respect to a selected feature (e.g., a feature interface representation of the feature and/or a feature emphasis interface element associated with the feature interface representation) of a card-based collaborative workflow management system. Different types of engagement can be assigned, weighted, and/or otherwise valued differently with respect to a particular feature. For example, in some embodiments, explicit, express, or direct interaction with, selection of, and/or engagement with a feature interface representation and/or a feature emphasis interface element associated with a feature by a user via a client device (e.g., as associated with an explicit feature engagement signal) may be assessed and/or assigned a relative value or worthwhile implicit or passive interaction (e.g., viewing and/or scrolling over without explicit, express, or direct interaction) with a feature interface representation and/or a feature emphasis interface element associated with a feature by a user via a client device (e.g., as associated with an implicit feature engagement signal) may be assessed and/or assigned little, no, or negative relative value or worth in determining a user feature engagement value with respect to the particular feature for the user.

The term "timestamp" refers to a data field comprising a sequence of characters or encoded information identifying when a certain event occurs. A timestamp is captured by a computing device of a card-based collaborative workflow management system (e.g., a feature emphasis decluttering server or the like), stored in one or more repositories (e.g., user data repository, feature release data repository, or the like), and/or transmitted to a feature emphasis decluttering server. In some embodiments, a timestamp is captured, converted to, and/or stored in a primary time standard. For example, in some embodiments, one or more timestamps are captured, converted to, and/or stored according to a network time standard or Coordinated Universal Time (UTC) global standard, thereby allowing calculations and comparisons to be performed regardless of source. In some embodiments, a timestamp is captured and/or represented to the level of milliseconds.

The term "user system initiation timestamp" refers to a data field comprising a sequence of characters or encoded information (e.g., timestamp) identifying when a user first established an account with the card-based collaborative workflow management system. The user system initiation timestamp is captured by a computing device of a card-based collaborative workflow management system (e.g., a feature emphasis decluttering server or the like), stored in one or more repositories (e.g., user data repository, feature release data repository, or the like), and transmitted to a feature emphasis decluttering server. In some embodiments, a user system initiation timestamp is captured, converted to, and/or stored in a primary time standard. For example, in some embodiments, one or more user system initiation timestamps are captured, converted to, and/or stored according to a Coordinated Universal Time (UTC) global standard, thereby allowing calculations and comparisons to be performed regardless of source.

The terms "client device", "computing device", "user device", and the like may be used interchangeably to refer to computer hardware that is configured (either physically or by the execution of software) to access one or more of an application, service, or repository made available by a server (e.g., apparatus of the present disclosure) and, among various other functions, is configured to directly, or indirectly, transmit and receive data. The server is often (but not always) on another computer system, in which case the client device accesses the service by way of a network. Example client devices include, without limitation, smart phones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure. In some embodiments, a client device is associated with a user. In some embodiments, an association is created by a client device transmitting authentication information associated with the user to the card-based collaborative workflow management system (e.g., feature emphasis decluttering server).

The terms "data," "content," "digital content," "digital content object," "signal", "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "application," "software application," "app," "product," "service" or similar terms refer to a computer program or group of computer programs designed to perform coordinated functions, tasks, or activities for the benefit of a user or group of users. A software application can run on a server or group of servers (e.g., a physical or virtual servers in a cloud-based computing environment). In certain embodiments, an application is designed for use by and interaction with one or more local, networked or remote computing devices, such as, but not limited to, client devices. Non-limiting examples of an application comprise workflow engines, service desk incident management, team collaboration suites, cloud services, word processors, spreadsheets, accounting applications, web browsers, email clients, media players, file viewers, videogames, audio-video conferencing, and photo/video editors. In some embodiments, an application is a cloud product.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "plurality" refers to two or more items.

The term "set" refers to a collection of one or more items.

The term "or" is used herein in both the alternative and conjunctive sense, unless otherwise indicated.

Having set forth a series of definitions called-upon throughout this application, an example system architecture and example apparatus is described below for implementing example embodiments and features of the present disclosure.

Example System Architecture

Methods, apparatuses, systems, and computer program products of the present disclosure may be embodied by any of a variety of computing devices. For example, the method, apparatus, system, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

With reference to FIG. 1, an example computing system 100 within which some embodiments of the present disclosure operate is illustrated. In particular, FIG. 1 illustrates an example card-based collaborative workflow management system 200 configured to communicate with one or more client devices 101A-101N in accordance with some example embodiments described herein. Users may access a card-based collaborative workflow management system 200 via a communications network 102 using one or more of client devices 101A-101N. Card-based collaborative workflow management system 200 may comprise a feature emphasis decluttering server 210 in communication with at least one repository, such as feature release data repository 215 and/or user data repository 225. Such repository(ies) may be hosted by the feature emphasis decluttering server 210 or otherwise hosted by devices in communication with the feature emphasis decluttering server 210. The card-based collaborative workflow management system 200 is, in some embodiments, able to generate and output feature emphasis interface element(s) and/or feature interface representation(s) for rendering to a card-based collaborative workflow management user interface associated with a user identifier, as will be described below.

Feature emphasis decluttering server 210 may include circuitry, networked processors, or the like configured to perform some or all of the feature emphasis decluttering server-based processes described herein (e.g., receiving feature status request(s), retrieving feature release data and/or user data, determining a feature emphasis value, causing rendering of feature emphasis interface element(s) and/or feature interface representation(s) to the card-based collaborative workflow management user interface displayed on one or more client devices 101A-101N, etc.), and may be any suitable network server and/or other type of processing device. In this regard, the feature emphasis decluttering server 210 may be embodied by any of a variety of devices, for example, the feature emphasis decluttering server 210 may be embodied as a computer or a plurality of computers. For example, feature emphasis decluttering server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, feature emphasis decluttering server 210 may be located remotely from the feature release data repository 215 and/or the user data repository 225, although in other embodiments, the feature emphasis decluttering server 210 may comprise the feature release data repository 215 and/or the user data repository 225. The feature emphasis decluttering server 210 may, in some embodiments, comprise several servers or computing devices performing interconnected and/or distributed functions. Despite the many arrangements contemplated herein, feature emphasis decluttering server 210 is shown and described herein as a single computing device to avoid unnecessarily overcomplicating the disclosure.

Feature emphasis decluttering server 210 can communicate with one or more client devices 101A-101N via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the card-based collaborative workflow management system 200.

Feature release data repository 215 may be stored by any suitable storage device configured to store some or all of the information described herein (e.g., memory 201 of the feature emphasis decluttering server 210 or a separate memory system separate from the feature emphasis decluttering server 210, such as one or more database systems, backend data servers, network databases, cloud storage devices, or the like provided by another device (e.g., online application or 3rd party provider), such as a Network Attached Storage (NAS) device or devices, or as a separate database server or servers). Feature release data repository 215 may comprise data received from the feature emphasis decluttering server 210 (e.g., via a memory 201 and/or processor(s) 202) and/or a client device 101A-101N, and the corresponding storage device may thus store this data. Feature release data repository 215 includes information accessed and stored by the feature emphasis decluttering server 210 to facilitate the operations of the card-based collaborative workflow management system 200. As such, feature release data repository 215 may include, for example, without limitation, one or more of feature release data, feature identifier(s), session identifier(s), user identifier(s), feature dependency indicator(s), feature discovery event(s), feature release thresholds, feature release expiration thresholds, user activity data logs, and/or the like.

User data repository 225 may be stored by any suitable storage device configured to store some or all of the information described herein (e.g., memory 201 of the feature emphasis decluttering server 210 or a separate memory system separate from the feature emphasis decluttering server 210, such as one or more database systems, backend data servers, network databases, cloud storage devices, or the like provided by another device (e.g., online application or 3rd party provider), such as a Network Attached Storage (NAS) device or devices, or as a separate database server or servers). User data repository 225 may comprise data received from the feature emphasis decluttering server 210 (e.g., via a memory 201 and/or processor(s) 202) and/or a client device 101A-101N, and the corresponding storage device may thus store this data. User data repository 225 includes information accessed and stored by the feature emphasis decluttering server 210 to facilitate the operations of the card-based collaborative workflow management system 200. As such, user data repository 225 may include, for example, without limitation, one or more of user data, user identifier(s), user profile data, user credentials, user system initiation timestamp(s), feature data, feature identifier(s), user feature engagement value(s), user activity data log(s), explicit feature engagement signals, implicit feature engagement signals, and/or the like.

The client devices 101A-101N may be implemented as any computing device as defined above. That is, the client devices 101A-101N may also include circuitry, networked processors, or the like configured to perform some or all of the apparatus-based processes described herein, and may include a suitable network server and/or other type of processing device (e.g., a controller or computing device of the client devices 101-101N). Electronic data received by the feature emphasis decluttering server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting the collaborative contextual summary interface to a user and otherwise providing access to the project management system 200. The depictions in FIG. 1 of "N" client devices are merely for illustration purposes. According to some embodiments, the client devices 101A-101N may be configured to display an interface on a display of the client device for viewing, editing, and/or otherwise interacting with at least one feature emphasis interface element, which may be provided by the card-based collaborative workflow management system 200.

In embodiments where a client device 101A-101N is a mobile device, such as a smartphone or tablet, the client device 101A-101N may execute an "app" to interact with the project management system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 101A-101N may interact with the project management system 200 via a web browser. As yet another example, the client devices 101A-101N may include various hardware or firmware designed to interface with the card-based collaborative workflow management system 200.

Example Apparatus for Implementing Embodiments of the Present Disclosure

FIG. 2 shows a schematic block diagram of example circuitry, some or all of which may be included in a feature emphasis decluttering server 210. In accordance with some example embodiments, feature emphasis decluttering server 210 may include various means, such as memory 201, processor 202, input/output circuitry 203, and/or communications circuitry 204. Moreover, in some embodiments, feature emphasis decluttering circuitry 205 may also or instead be included in the feature emphasis decluttering server 210. For example, where feature emphasis decluttering circuitry 205 is included in feature emphasis decluttering server 210, feature emphasis decluttering circuitry 205 may be configured to facilitate the functionality discussed herein regarding determining a feature emphasis value and causing rendering of feature emphasis interface element(s) and/or a feature interface representation(s). An apparatus, such as feature emphasis decluttering server 210, may be configured, using one or more of the circuitry 201, 202, 203, 204, and 205, to execute the operations described above with respect to FIG. 1 and below in connection with FIGS. 3-5.

Although the use of the term "circuitry" as used herein with respect to components 201-205 are described in some cases using functional language, it should be understood that the particular implementations necessarily include the use of particular hardware configured to perform the functions associated with the respective circuitry as described herein. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry. It will be understood in this regard that some of the components described in connection with the feature emphasis decluttering server 210 may be housed within this device, while other components are housed within another of these devices, or by yet another device not expressly illustrated in FIG. 1.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the feature emphasis decluttering server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, feature emphasis decluttering server 210. The memory 201 is non-transitory and may include, for example, one or more volatile and/or non-volatile memories, or some combination thereof. In other words, for example, the memory 201 may be an electronic storage device (e.g., a non-transitory computer readable storage medium). The memory 201 may be configured to store information, data, content, signals, applications, instructions (e.g., computer-executable program code instructions), or the like, for enabling an apparatus, e.g., feature emphasis decluttering server 210, to carry out various functions in accordance with example embodiments of the present disclosure. For example, memory 201 may be configured to store user data, feature release data, user identifier(s), feature identifier(s), session identifier(s), feature emphasis value(s), display feature threshold(s), feature engagement threshold(s), explicit feature engagement signal(s), implicit feature engagement signal(s), feature release threshold(s), timestamp(s), user system initiation timestamp(s), user activity data log(s), user feature engagement values, feature dependency indicator(s), feature discovery event(s) and/or any other suitable data or data structures. It will be understood that the memory 201 may be configured to store partially or wholly any electronic information, data, data structures, embodiments, examples, figures, processes, operations, techniques, algorithms, instructions, systems, apparatuses, methods, or computer program products described herein, or any combination thereof.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling feature emphasis decluttering server 210 to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by feature emphasis decluttering server 210 during the course of performing its functionalities.

Processor 202 may be embodied in a number of different ways and may, for example, include one or more processing devices configured to perform independently. Additionally, or alternatively, processor 202 may include one or more processors configured in tandem via a bus to enable independent execution of instructions, pipelining, and/or multi-threading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as feature emphasis decluttering server 210. The plurality of processors may be in operative communication with each other and may be collectively configured to perform one or more functionalities of feature emphasis decluttering server 210 as described herein.

In an example embodiment, processor 202 is configured to execute instructions stored in the memory 201 or otherwise accessible to processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause feature emphasis decluttering server 210 to perform one or more of the functionalities of feature emphasis decluttering server 210 as described herein.

In some embodiments, feature emphasis decluttering server 210 further includes input/output circuitry 203 that may, in turn, be in communication with processor 202 to provide an audible, visual, mechanical, or other output and/or, in some embodiments, to receive an indication of an input from a user, a client device 101A-101N, or another source. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface and may comprise a web user interface, a mobile application, a kiosk, or the like. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In some embodiments, aspects of input/output circuitry 203 may be reduced as compared to embodiments where feature emphasis decluttering server 210 may be implemented as an end-user machine or other type of device designed for complex user interactions. In some embodiments (like other components discussed herein), input/output circuitry 203 may even be eliminated from feature emphasis decluttering server 210. Input/output circuitry 203 may be in communication with memory 201, communications circuitry 204, and/or any other component(s), such as via a bus. Although more than one input/output circuitry and/or other component can be included in feature emphasis decluttering server 210, only one is shown in FIG. 2 to avoid overcomplicating the disclosure (e.g., like the other components discussed herein).

Communications circuitry 204, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with feature emphasis decluttering server 210. In this regard, communications circuitry 204 may include, for example, a network interface for enabling communications with a wired or wireless communication network. For example, in some embodiments, communications circuitry 204 is configured to receive and/or transmit any data that may be stored by memory 201 using any protocol that may be used for communications between computing devices. For example, communications circuitry 204 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 204 includes circuitry for interacting with the antenna(s) to cause transmission of signals via the antenna(e) or to handle receipt of signals received via the antenna(e). These signals may be transmitted by feature emphasis decluttering server 210 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of feature emphasis decluttering server 210, such as via a bus.

In some embodiments, feature emphasis decluttering circuitry 205 may also or instead be included and configured to perform the functionalities discussed herein related to, inter alia, determining a feature emphasis value and causing rendering of feature emphasis interface element(s) and/or feature interface representation(s). In some embodiments, feature emphasis decluttering circuitry 205 includes hardware, software, firmware, and/or a combination of such components, configured to support various aspects of such feature emphasis interface element-related functionality, features, and/or services of the feature emphasis decluttering server 210 as described herein (e.g., designed and/or configured to receive, process, generate, and transmit data such as feature status request(s), user data, and/or feature release data, determine a feature emphasis value based at least in part on user system initiation timestamp(s), current timestamp(s), and user feature engagement value(s), and causing rendering of feature emphasis interface element(s) and/or feature interface representation(s)) based on display feature threshold(s)). In some embodiments, the feature emphasis decluttering circuitry 205 analyzes user data and/or feature release data (e.g., user system initiation timestamp(s), current timestamp(s), and user feature engagement value(s)) to determine a feature emphasis value for each of one or more feature identifiers and causes rendering of a feature emphasis interface element and/or a feature interface representation. For example, in some embodiments, the feature emphasis decluttering circuitry 205 determines a feature emphasis value for each feature identifier based at least in part on user system initiation timestamp(s), current timestamp(s), and user feature engagement value(s). In some embodiments, the feature emphasis decluttering circuitry 205 determines if the feature emphasis value satisfies or fails to satisfy a display feature threshold. In response to determining that the feature emphasis value satisfies a corresponding display feature threshold for a selected feature identifier, in certain embodiments, the feature emphasis decluttering circuitry 205 may generate a display signal associated with a feature emphasis interface element and a feature interface representation associated with the selected feature identifier and transmit the display signal to the input/output circuitry 203, the communications circuitry, or both for alerting a user of such emphasis of such feature identifier (e.g., cause rendering of a feature emphasis interface element to the card-based collaborative workflow management user interface in association with the feature interface representation corresponding to the feature identifier). In response to determining that the feature emphasis value fails to satisfy a corresponding display feature threshold for a selected feature identifier, the feature emphasis decluttering circuitry 205 may generate a display signal associated with a feature interface representation associated with the selected feature identifier and transmit the display signal to the input/output circuitry 203, the communications circuitry, or both for cause rendering of the feature interface representation corresponding to the feature identifier to the card-based collaborative workflow management user interface.

It should be appreciated that in some embodiments, feature emphasis decluttering circuitry 205 performs one or more of such exemplary actions in combination with another set of circuitry of the feature emphasis decluttering server 210, such as one or more of memory 201, processor 202, input/output circuitry 203, and communications circuitry 204. For example, in some embodiments, feature emphasis decluttering circuitry 205 utilizes processing circuitry, such as the processor 202 and/or the like, to perform one or more of its corresponding operations. In a further example, in some embodiments, some or all of the functionality of feature emphasis decluttering circuitry 205 may be performed by processor 202. In this regard, some or all of the example processes and algorithms discussed herein can be performed by at least one processor 202 and/or feature emphasis decluttering circuitry 205. It should also be appreciated that, in some embodiments, feature emphasis decluttering circuitry 205 may include a separate processor, specially configured field programmable gate array (FPGA), or application specific interface circuit (ASIC) to perform its corresponding functions.

Additionally or alternatively, in some embodiments, feature emphasis decluttering circuitry 205 utilizes memory 201 to store collected information. For example, in some implementations, feature emphasis decluttering circuitry 205 includes hardware, software, firmware, and/or a combination thereof, that interacts with feature release data repository 215, user feature release data repository 225, and/or memory 201 to send, retrieve, update, and/or store data values embodied by and/or associated with a feature emphasis interface element including, but not limited to, user data, feature release data, user identifier(s), feature identifier(s), session identifier(s), display feature threshold(s), feature emphasis value(s), feature engagement threshold(s), feature release expiration threshold(s), explicit feature engagement signal(s), implicit feature engagement signal(s), timestamp(s) (e.g., user system initiation timestamp(s)), user activity data log(s), feature dependency indicator(s), feature discovery event(s) and associated data that is configured for association with, for example, determining feature emphasis value(s), and to support the operations of the feature emphasis decluttering circuitry 205 and the remaining circuitry. Additionally or alternatively, in some embodiments, feature emphasis decluttering circuitry 205 utilizes input/output circuitry 203 to facilitate user output (e.g., causing rendering of one or more user interface component(s) such as feature emphasis interface element(s) and/or feature interface representation(s)), and/or to receive user input (e.g., user clicks, user taps, keyboard interactions, user gesture, and/or the like). Additionally or alternatively still, in some embodiments, the feature emphasis decluttering circuitry 205 utilizes communications circuitry 204 to initiate transmissions to another computing device, receive transmissions from another computing device, communicate signals between the various sets of circuitry as depicted, and/or the like.

Accordingly, non-transitory computer readable storage media can be configured to store firmware, one or more application programs, and/or other software, which include instructions and/or other computer-readable program code portions that can be executed to control processors of the components of feature emphasis decluttering server 210 to implement various operations, including the examples shown herein. As such, a series of computer-readable program code portions may be embodied in one or more computer program products and can be used, with a device, feature emphasis decluttering server 210, database, and/or other programmable apparatus, to produce the machine-implemented processes discussed herein. It is also noted that all or some of the information discussed herein can be based on data that is received, generated and/or maintained by one or more components of the feature emphasis decluttering server 210. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of feature emphasis decluttering server 210 and client devices 101A-101N.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with a client device or an admin user interacting with an admin device). Information/data generated at the client device (e.g., as a result of the user interaction with an admin device) can be received from the client device (e.g., client device or admin device) at the server.

In various embodiments of the present disclosure, an apparatus (e.g., feature emphasis decluttering server 210) is configured to manage a feature emphasis interface element in association with a card-based collaborative workflow management system 200. FIGS. 3A, 3B, 3C, and 3D illustrate example feature emphasis interface elements 301 structured in accordance with example embodiments of the present disclosure. It should be appreciated that the depicted feature emphasis interface elements 301 are exemplary. Examples of visual representations associated with a feature emphasis interface element 301 include, but are not limited to, an icon, text, and/or background displayed in a graphical user interface (e.g., card-based collaborative workflow management user interface 300). For example, in a non-limiting illustration, a feature emphasis interface element 301 rendered in association with a feature interface representation 302 of a feature may comprise text (e.g., such as "NEW" in FIG. 3A) in green, a green icon, and/or a green background shading to indicate that the corresponding feature may be new to the user. Additional examples of feature emphasis interface elements 301 include emphasizing an icon or text displayed to the card-based collaborative workflow management user interface 300 (e.g., coloring scheme, highlighted, bolded, italicized, enlarged, shaded, flashing, pulsing, or changing in size, etc.). In still further examples, in some embodiments, a feature emphasis interface element 301 includes one or more associated secondary feature emphasis interface elements 301B. For example, as depicted in FIG. 3B, the feature emphasis interface element 301 includes a secondary feature emphasis interface element 301B providing additional information to the user in association with a primary feature emphasis interface element 301A (e.g., "NEW" icon). Still further, in some embodiments, the feature emphasis interface element 301 comprises one or more interactive links which direct the user to additional information (e.g., user education) such as depicted in the secondary feature emphasis interface element 301B of FIG. 3B (e.g., depicted "Learn more" engageable link). As such, the example feature emphasis interface elements 301 depicted therein is provided for descriptive and illustrative purposes and is not to limit the scope or spirit of the disclosure herein.

In a non-limiting example, the depicted feature emphasis interface element 301 is rendered to the card-based collaborative workflow management user interface 300 as depicted in FIG. 3A. It should be appreciated that the information depicted in the example card-based collaborative workflow management user interface 300 is exemplary, and that similar and/or alternative data, parameters, data values, and/or the like may be provided. Additionally or alternatively, in some embodiments, the layout of the various interface elements, and/or sub-interfaces of the depicted card-based collaborative workflow management user interface 300 may differ without deviating from scope of this disclosure. In some embodiments, the card-based collaborative workflow management user interface 300 is rendered to a client device, for example, client device 101A-101N associated with a user. In some embodiments, a card-based collaborative workflow management system 200 (e.g., feature emphasis decluttering server 210) causes rendering of the card-based collaborative workflow management user interface 300 in response to receiving a display card-based collaborative workflow management user interface request from the client device 101A-101N to the card-based collaborative workflow management system 200 (e.g., feature emphasis decluttering server 210).

In some embodiments, a card-based collaborative workflow management user interface 300 comprises one or more feature interface representations 302 of corresponding features (e.g., the "Butler" feature in FIG. 3A, the camera feature depicted in FIG. 3C, the search bar feature depicted in FIG. 3D, and the like).

In some embodiments, a card-based collaborative workflow management user interface 300 comprises one or more renderings of card data object(s) 305, list data objects 310, and/or board data object(s) 315, to enable collaboration among users as depicted in FIG. 3A. For example, in some embodiments, a card data object 305 represents one or more tasks associated with a team or group of people in the card-based collaborative workflow management system 200. In some embodiments, one or more card data objects 305 are associated with a list data object 310, which represents a list of tasks associated with the team or group of people. In still further embodiments, one or more card data objects 305 and/or one or more list data objects 310 are associated with a board data object 315 such that the board data object 315 is an organized set of the one or more list data objects 310 and/or the one or more card data objects 305. For example, in some embodiments, a board data object 315 corresponds to and/or represents a project and each card data object 305 and/or list data object 310 associated with the board data object 315 represents a subset of tasks associated with such project. As such, a card-based collaborative workflow management interface 300 allows users to interact with a card-based collaborative workflow management system 200, allowing such user or a group of users to manage various tasks based at least in part on the renderings of one or more card data objects 305, one or more list data objects 310, and/or one or more board data objects 315.

Example Operations Performed

Having described the apparatus, system, and exemplary circuitry comprising embodiments of the present disclosure, it should be understood that the apparatus may proceed to manage a feature emphasis interface element in association with a card-based collaborative workflow management system in a number of ways. FIG. 4A is a flowchart broadly illustrating a series of operations or process blocks that are executed or performed to manage a feature emphasis interface element in accordance with some example embodiments of the present disclosure. The operations illustrated in FIG. 4A may, for example, be performed by, with the assistance of, and/or under the control of an apparatus (e.g., feature emphasis decluttering server 210), as described above. In this regard, performance of the operations may invoke one or more of memory 201, processor 202, input/output circuitry 203, communications circuitry 204, and/or feature emphasis decluttering circuitry 205.

In the embodiment illustrated in FIG. 4A, the example flowchart illustrates method 400 which begins by receiving a feature status request at Block 402. For example, the feature emphasis decluttering server 210 may include means, such as the processor 202, input/output circuitry 203, communications circuitry 204, feature emphasis decluttering circuitry 205, or the like, for receiving a feature status request. For example, in some embodiments, the feature status request is generated at an apparatus, e.g., a client device 101A, in response to user interaction with a card-based collaborative workflow management user interface. In certain embodiments, the feature status request is associated with a card-based collaborative workflow management user interface request. In still further embodiments, the feature status request comprises and/or is associated with a user identifier and one or more feature identifiers.

As depicted at Block 404, in some embodiments, the feature emphasis decluttering server 210 includes means, such as the processor 202, input/output circuitry 203, communications circuitry 204, feature emphasis decluttering circuitry 205, or the like, for retrieving feature release data associated with each of the one or more feature identifiers from a feature release data repository. For example, in some embodiments, the feature emphasis decluttering circuitry 205 generates and/or transmits signals in order to query a repository for feature release data using the one or more feature identifiers. For example, using each of the one or more feature identifiers associated with the feature status request received at Block 402, the feature emphasis decluttering server 210 queries a repository, such as feature release data repository 215, to access and/or retrieve feature release data associated with a feature corresponding to a selected feature identifier. In some embodiments, the retrieved feature release data comprises a feature release threshold and a feature release expiration threshold for each feature of the one or more feature identifiers. Block 404 can be performed prior to, concurrently, or subsequent to Block 406.

As depicted at Block 406, in some embodiments, the feature emphasis decluttering server 210 includes means, such as the processor 202, input/output circuitry 203, communications circuitry 204, feature emphasis decluttering circuitry 205, or the like, for retrieving user data. For example, in some embodiments, the feature emphasis decluttering circuitry 205 generates and/or transmits signals in order to query a repository for user data using a user identifier and/or a feature identifier. For example, using the user identifier and the feature identifier(s) associated with the feature status request received at Block 402, the feature emphasis decluttering server 210 queries a repository, such as user data repository 225, to access and/or retrieve user data associated with a user corresponding to the user identifier and the feature identifier. In this regard, the retrieved user data comprises at least a user system initiation timestamp and a user feature engagement value for each of the one or more feature identifiers. Block 406 can be performed prior to, concurrently, or subsequent to Block 404.

At Block 408, the method 400 further includes determining a feature emphasis value. For example, the feature emphasis decluttering server 210 may include means, such as the processor 202, communications circuitry 204, feature emphasis decluttering circuitry 205, or the like, for determining a feature emphasis value based at least in part on the user system initiation timestamp, a current timestamp, and the user feature engagement value for each of the one or more feature identifiers. The process for determining the feature emphasis value is described in greater detail below with respect to FIG. 5.

At Block 410, the method 400 further includes, for each instance wherein the feature emphasis value satisfies a display feature threshold, rendering a feature emphasis interface element 301 to a card-based collaborative workflow management user interface 300 in association with a feature interface representation 302 corresponding to the feature identifier. For example, the feature emphasis decluttering server 210 may include means, such as the processor 202, communications circuitry 204, feature emphasis decluttering circuitry 205, or the like, for determining whether the feature emphasis value determined in Block 408 satisfies a display feature threshold. In this regard, display feature threshold(s) are normally stored in feature release data repository 215 and/or user data repository 225, and therefore, in some embodiments, one or more display feature threshold(s) are accessed and/or retrieved above in Block 404 and/or Block 406.

In some embodiments, the display feature threshold defines one or more criteria that must be satisfied, achieved, present, and/or met with respect to the particular feature identifier in order for a corresponding feature emphasis interface element 301 to be rendered to a card-based collaborative workflow management user interface 300. In a non-limiting contextual example, in order to cause rendering of a feature emphasis interface element 301, a display feature threshold associated with the particular feature identifier requires the user to be a member of the card-based collaborative workflow management system 200 prior to a release of the feature in the card-based collaborative workflow management system 200, requires that the feature is not expired, and/or requires that the user not have previously engaged with the feature. Accordingly, in some embodiments, the feature emphasis value determined at Block 408 satisfies a display feature threshold in an instance wherein the user system initiation timestamp satisfies the feature release threshold, the current timestamp satisfies the feature release expiration threshold, and the user feature engagement value satisfies the feature engagement threshold, as described below with respect to FIG. 5. In still further embodiments, the feature emphasis value fails to satisfy the display feature threshold in an instance wherein the user system initiation timestamp fails to satisfy the feature release threshold, the current timestamp fails to satisfy the feature release expiration threshold, and/or the user feature engagement value fails to satisfy the feature engagement threshold, as described below with respect to FIG. 5.

In still further embodiments, the display feature threshold associated with a selected feature identifier optionally defines a feature dependency threshold. For example, in some embodiments, the determination of whether to display a feature emphasis interface element in association with a second feature of a card-based collaborative workflow management system is dependent on the user having interacted with a selected first feature. In still further embodiments, the determination of whether to display a feature representation of a second feature (e.g., whether the second feature is even displayed) of a card-based collaborative workflow management system is dependent on the user having interacted with a selected first feature. For example, in some embodiments, a second feature identifier is associated with a feature dependency indicator, wherein the feature dependency indicator identifies one or more other feature identifiers (e.g., a first feature identifier) upon which the second feature identifier is dependent. Accordingly, in some embodiments, when the display feature threshold associated with a second feature identifier optionally defines a feature dependency threshold with respect to a first feature identifier, the feature emphasis decluttering server 210 first determines whether the feature emphasis value associated with the first feature identifier satisfies a display feature threshold associated with the first feature identifier, and only determines and/or renders a feature emphasis interface element 301 with respect to the second feature identifier if the feature emphasis value associated with the first feature identifier fails to satisfy the display feature threshold associated with the first feature identifier (e.g., the first feature is not associated with a "NEW" feature emphasis interface element 301).

At Block 412, the method 400 further optionally includes, for each instance wherein the feature emphasis value fails to satisfy a display feature threshold, rendering a feature interface representation 302 corresponding to the feature identifier to the card-based collaborative workflow management user interface 300. For example, the feature emphasis decluttering server 210 may include means, such as the processor 202, communications circuitry 204, feature emphasis decluttering circuitry 205, or the like, for determining whether the feature emphasis value determined in Block 408 fails to satisfy the display feature threshold accessed and/or retrieved above in Block 404 and/or Block 406. If such display feature threshold fails to be satisfied, in some embodiments, the feature emphasis decluttering server 210 causes rendering of a feature interface representation 302 (e.g., without a feature emphasis interface element 301) corresponding to the feature identifier to the card-based collaborative workflow management user interface 300. In a non-limiting contextual example, the feature emphasis value fails to satisfy the display feature threshold described in Block 410 when the user became a member of the card-based collaborative workflow management system 200 after the feature was released, the feature release campaign has expired, and/or the user has previously engaged with the feature in a certain manner. Accordingly, in some embodiments, the feature emphasis value determined at Block 408 fails to satisfy a display feature threshold in an instance wherein the user system initiation timestamp fails to satisfy the feature release threshold, the current timestamp fails to satisfy the feature release expiration threshold, and/or the user feature engagement value fails to satisfy the feature engagement threshold, as described below with respect to FIG. 5. In such instances, the feature emphasis decluttering server 210 causes rendering of a feature interface representation 302 corresponding to the feature identifier to the card-based collaborative workflow management user interface 300 (e.g., without a feature emphasis element 301).

Subsequently, at Block 414, the feature emphasis decluttering server 210 may optionally include means, such as processor 202, input/output circuitry 203, communications circuitry 204, feature emphasis decluttering circuitry 205, or the like, for monitoring user interaction with the card-based collaborative workflow management user interface 300. In this regard, the feature emphasis decluttering server 210 may optionally include means, such as processor 202, input/output circuitry 203, communications circuitry 204, feature emphasis decluttering circuitry 205, or the like, for identifying an explicit feature engagement signal at Block 416. In some embodiments, the explicit feature engagement signal comprises a first feature identifier of the one or more feature identifiers associated with the card-based collaborative workflow management user interface 300. In a non-limiting contextual example, the explicit feature engagement signal indicates express user interaction with the feature interface representation 302 and/or the feature emphasis interface element 301 rendered to the card-based collaborative workflow management user interface 300 at Block 410. That is, in some embodiments, identifying the explicit feature engagement signal is triggered by user engagement of the feature emphasis interface element 301 associated with the feature interface representation corresponding to the first feature identifier and in certain embodiments, identifying the explicit feature engagement signal is triggered by user engagement of the feature interface representation 302 corresponding to the first feature identifier.

As depicted at Blocks 418 and 420, in some embodiments, the feature emphasis decluttering server 210 optionally includes means, such as the processor 202, input/output circuitry 203, communications circuitry 204, feature emphasis decluttering circuitry 205, or the like, for automatically updating the card-based collaborative workflow management user interface 300 to remove the feature emphasis interface element 301 (e.g., which was rendered at Block 410) associated with the feature interface representation 302 and causing storage of an updated user feature engagement value associated with the user identifier and the first feature identifier in a repository (e.g., user data repository 225).

FIG. 4B is a signal diagram of an example data flow represented by method 400. That is, FIG. 4B illustrates an example signal diagram illustrating data flow interactions between a feature emphasis decluttering server, one or more repositories, and a client device when managing a feature emphasis interface element in accordance with one embodiment. Method 400 is described as being performed by a client device 101A, a feature emphasis decluttering server 210, feature release data repository 215, and/or user data repository 225. These may be similar to those previously discussed with regards to FIG. 1.

Turning now to FIG. 5, example operations or process blocks are shown for determining a feature emphasis value with respect to each of the one or more feature identifiers. As with FIG. 4A, the operations illustrated in FIG. 5 may, for example, be performed by the card-based collaborative workflow management system 200, with the assistance of, and/or under the control of one or more devices, such as feature emphasis decluttering server 210, and may invoke one or more of memory 201, processor 202, input/output circuitry 203, communications circuitry 204, and/or feature emphasis decluttering circuitry 205.

In the embodiment illustrated in FIG. 5, the example flowchart illustrates method 500 which includes determining whether the user system initiation timestamp satisfies the feature release threshold at Block 502. For example, the feature emphasis decluttering server 210 may include means, such as the processor 202, input/output circuitry 203, communications circuitry 204, feature emphasis decluttering circuitry 205, or the like, for determining whether the user system initiation timestamp retrieved above in Block 406 satisfies the feature release threshold retrieved above in Block 404. In some embodiments, the user system initiation timestamp satisfies the feature release threshold in an instance wherein the user system initiation timestamp antedates (e.g., predates) the feature release threshold. For example, in an instance wherein a feature is released and/or made available to users of a card-based collaborative workflow management system 200 (e.g., Trello®) on Dec. 1, 2021 (e.g., feature release threshold) and a user signed up for and/or became a member of the card-based collaborative workflow management system 200 on Nov. 15, 2021 (e.g., user system initiation timestamp), the user system initiation timestamp antedates the feature release threshold such that the user system initiation timestamp satisfies the feature release threshold. In this regard, the feature emphasis decluttering server 210 includes means, such as the processor 202, feature emphasis decluttering circuitry 205, or the like, for determining that the user system initiation timestamp satisfies the feature release threshold.

In some embodiments, the user system initiation timestamp fails to satisfy the feature release threshold in an instance wherein the user system initiation timestamp postdates the feature release threshold. For example, in an instance wherein a feature is released and/or made available to users of a card-based collaborative workflow management system 200 (e.g., Trello) on Dec. 1, 2021 (e.g., feature release threshold) and a user signed up for and/or became a member of the card-based collaborative workflow management system 200 on Dec. 15, 2021 (e.g., user system initiation timestamp), the user system initiation timestamp postdates the feature release threshold such that the user system initiation timestamp fails to satisfy the feature release threshold. In this regard, the feature emphasis decluttering server 210 includes means, such as the processor 202, feature emphasis decluttering circuitry 205, or the like, for determining that the user system initiation timestamp fails to satisfy the feature release threshold. Block 502 can be performed prior to, concurrently, or subsequent to Block 504 and/or Block 506.

At Block 504, the feature emphasis decluttering server 210 includes means, such as the processor 202, input/output circuitry 203, communications circuitry 204, feature emphasis decluttering circuitry 205, or the like, for determining whether the current timestamp satisfies the feature release expiration threshold retrieved above in Block 404. In some embodiments, a current timestamp is a current timestamp associated with a network time standard or Coordinated Universal Time (UTC) global standard such that the current timestamp is captured by the feature emphasis decluttering server 210. In other embodiments, the current timestamp is received and/or retrieved by the feature emphasis decluttering server. For example, in some embodiments, the feature status request received in Block 402 further comprises a current timestamp. In another non-limiting example, the current timestamp is retrieved from an external system to the card-based collaborative workflow management system 200.

In some embodiments, the current timestamp satisfies the feature release expiration threshold in an instance wherein the current timestamp antedates (e.g., predates) the feature release expiration threshold. For example, in an instance wherein a feature is associated with and/or assigned a feature expiration date, time, and/or condition (e.g., feature release expiration threshold) in a card-based collaborative workflow management system 200 and such feature release expiration threshold has not yet passed (e.g., the current timestamp antedates such feature release expiration threshold), the current timestamp satisfies the feature release expiration threshold. In this regard, the feature emphasis decluttering server 210 includes means, such as the processor 202, feature emphasis decluttering circuitry 205, or the like, for determining that the current timestamp satisfies the feature release expiration threshold.

In some embodiments, the current timestamp fails to satisfy the feature release expiration threshold in an instance wherein the current timestamp postdates the feature release expiration threshold. For example, in an instance wherein a feature is associated with and/or assigned a feature expiration date, time, and/or condition (e.g., feature release expiration threshold) in a card-based collaborative workflow management system 200 and such feature release expiration threshold has passed (e.g., the current timestamp postdates such feature release expiration threshold), the current timestamp fails to satisfy the feature release expiration threshold. In this regard, the feature emphasis decluttering server 210 includes means, such as the processor 202, feature emphasis decluttering circuitry 205, or the like, for determining that the current timestamp fails to satisfy the feature release expiration threshold. Block 504 can be performed prior to, concurrently, or subsequent to Block 502 and/or Block 506.

At Block 506, the feature emphasis decluttering server 210 includes means, such as the processor 202, input/output circuitry 203, communications circuitry 204, feature emphasis decluttering circuitry 205, or the like, for determining whether the user feature engagement value satisfies a feature engagement threshold. In this regard, feature engagement threshold(s) are normally stored in feature release data repository 215 and therefore, in some embodiments, the feature engagement threshold is accessed and/or retrieved above in Block 404.

In some embodiments, the operation in Block 506 includes determining a user feature engagement value for the particular user (e.g., user identifier) with respect to each feature associated with the feature status request in Block 402. For example, in some embodiments, the feature emphasis decluttering server 210 analyzes a user activity data log associated with the user identifier that documents user engagement with one or more features (e.g., feature identifiers) of the card-based collaborative workflow management system 200. In this regard, user activity data log(s) are normally stored in feature release data repository 215 and/or user data repository 225, and therefore, in some embodiments, the user activity data log is accessed and/or retrieved above in Block 404 and/or Block 406.

With respect to a user activity data log, different types of user engagement can be assigned, weighted, and/or otherwise valued differently with respect to a particular feature. For example, in some embodiments, explicit, express, or direct interaction (e.g., as associated with an explicit feature engagement signal) with, selection of, and/or engagement with a feature interface representation and/or a feature emphasis interface element associated with a feature by a user via a client device is assessed and/or assigned a greater relative value or worth by the feature emphasis decluttering server 210 while implicit or passive interaction (e.g., viewing and/or scrolling over without explicit, express, or direct interaction) with a feature interface representation and/or a feature emphasis interface element associated with a feature by a user via a client device (e.g., as associated with an implicit feature engagement signal) is assessed and/or assigned little, no, or negative relative value or worth by the feature emphasis decluttering server 210 in determining a user feature engagement value with respect to the particular feature for the user.

In this regard, in some embodiments, the user feature engagement value satisfies the feature engagement threshold in an instance wherein the user activity data log documenting user engagement with the feature does not comprise a data entry identifying an explicit feature engagement signal stored in association with the particular feature identifier and the user identifier. That is, the user activity data log does not indicate prior express user engagement with the feature interface representation and/or the feature emphasis interface element associated with the particular feature identifier by the user. In still further embodiments, the user feature engagement value satisfies the feature engagement threshold in an instance wherein the user activity data log comprises at least one data entry identifying one or more implicit feature engagement signals stored in association with the feature identifier, the user identifier, and a session identifier associated with a current user session.

In some embodiments, the user feature engagement value fails to satisfy the feature engagement threshold in an instance wherein the user activity data log comprises at least one data entry identifying one or more explicit feature engagement signals stored in association with the feature identifier and the user identifier. That is, the user activity data log indicates prior express user engagement with the feature interface representation and/or the feature emphasis interface element associated with the particular feature identifier by the user, whether in the current user session or a prior user session. In still further embodiments, the user feature engagement value fails to satisfy the feature engagement threshold in an instance wherein the user activity data log comprises one or more implicit feature engagement signals stored in association with the feature identifier, the user identifier, and a session identifier, wherein the session identifier is associated with a user session that differs from a current user session. That is, the user activity data log indicates that the user implicitly engaged with the feature (e.g., the feature emphasis interface element was displayed to the card-based collaborative workflow management user interface while the user viewed and/or scrolled through the card-based collaborative workflow management user interface without explicit, express, or direct interaction with the feature interface representation and/or feature emphasis interface element) in a user session that differs from the current user session (e.g., a prior user session, a concurrent user session open in another tab on the same or different client device 101A-101N, etc.).

In a non-limiting contextual example, a user accesses the card-based collaborative workflow management system via the card-based collaborative workflow management user interface in a first session, Session 1. The feature emphasis decluttering server determines that a feature emphasis value associated with Feature A satisfies the display feature threshold, and causes rendering of a feature emphasis interface element to the card-based collaborative workflow management user interface in association with the feature interface representation of Feature A. During Session 1, the user does not explicitly interact with (e.g., click on, select, etc.) Feature A or its associated feature emphasis interface element. Instead, the feature emphasis interface element is simply rendered to the card-based collaborative workflow management user interface and remains visible during Session 1 while the user may otherwise interact with other features and/or experiences in the card-based collaborative workflow management system. The feature emphasis decluttering server generates, maintains, and/or updates a user activity data log associated with the user to include an implicit feature engagement signal associated with the feature identifier of Feature A and the user's user identifier, and in some embodiments, a session identifier associated with the current session (e.g., Session 1). The feature emphasis interface element associated with Feature A remains visible to the user during the remainder of Session 1 without the user explicitly interacting with Feature A or its feature emphasis interface element. During Session 2, a different session, the feature emphasis decluttering server analyzes the user activity data log to determine that Feature A is associated with an implicit feature engagement signal with respect to the user in a different session (i.e., Session 1). Accordingly, in such non-limiting contextual example, the feature emphasis decluttering server determines that the user feature engagement value fails to satisfy the feature engagement threshold with respect to Feature A for the user, and does not render a feature emphasis interface element with respect to Feature A during Session 2 even though the user never explicitly interacted with Feature A.

Additionally or alternatively, in some embodiments, the feature emphasis decluttering server optionally programmatically monitors, tracks, and/or analyzes feature discovery events and metrics associated with user experiences, such as based on a user's interaction with various feature interface representations and/or feature emphasis interface elements as reflected in user activity logs, to determine an appropriate exposure level to relevant status information, such as a display feature threshold. Such exposure level can be determined in a myriad of ways. For example, in some embodiments, users can define exposure level thresholds (e.g., display feature threshold) via user interaction with the card-based collaborative workflow management system 200. Additionally or alternatively, in some embodiments, the apparatus provides for use of a machine learning model designed to leverage artificial intelligence in connection with the dynamic determination of an appropriate exposure level, such as the display feature threshold. In determining the appropriate exposure level, the apparatus may draw from a range of information sources that can be supplied to the machine learning model in order to make suggestions or predictions as to a realistic and appropriate exposure level. For example, any one or more of the data described herein (e.g., feature release data, user data, user activity logs, historical data, and/or the like) and correlations thereof can be used in connection with the machine learning model. For example, in some embodiments, although the varied data inputted and outputted in card-based collaborative workflow management environment is not necessarily comparable nor are the key exposure indicators necessarily selectable by a human, the dissimilar aggregate data structure formed from such complex data corpus can be analyzed by the machine learning model to programmatically determine at least the appropriate exposure level to relevant status information (e.g., display feature threshold). Moreover, in some embodiments, the machine learning based model employed by the apparatus can be trained using such historical feature release data, user data, user activity log(s) and/or the like. For example, in some embodiments, the apparatus (e.g., via feature emphasis decluttering circuitry 205) implements an unsupervised learning structure, a supervised learning structure, a reinforcement learning structure, a deep learning structure, and/or the like for programmatically determining correlations of the varied data and data formats to make suggestions or predictions as to at least the appropriate exposure level to relevant status information.

FIGS. 4A, 4B, and 5 thus illustrate flowcharts and signal diagrams describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 201 of the feature emphasis decluttering server 210 and executed by a processor 202 of the feature emphasis decluttering server 210. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus configured to manage a feature emphasis interface element in association with a card-based collaborative workflow management system, the apparatus comprising at least one processor and at least one non-transitory memory, the at least one non-transitory memory having computer-coded instructions therein, wherein the computer-coded instructions are configured to, in execution with the at least one processor, cause the apparatus to:

receive a feature status request comprising a user identifier and one or more feature identifiers, wherein the feature status request comprises a request for a status of one or more features of the card-based collaborative workflow management system with respect to a particular user, the one or more features corresponding to the respective one or more feature identifiers and the particular user corresponding to the user identifier;

retrieve feature release data associated with each feature identifier of the one or more feature identifiers from a feature release data repository;

retrieve user data associated with the user identifier from a user data repository, wherein the user data comprises at least a user system initiation timestamp and a user feature engagement value for each feature identifier of the one or more feature identifiers;

for each feature identifier of the one or more feature identifiers, determine a feature emphasis value based at least in part on the user system initiation timestamp, a current timestamp, and the user feature engagement value;

for each circumstance wherein the feature emphasis value satisfies a display feature threshold, cause rendering of a feature emphasis interface element to a card-based collaborative workflow management user interface in association with a feature interface representation corresponding to the feature identifier; and for each circumstance wherein the feature emphasis value fails to satisfy the display feature threshold, cause rendering of the feature interface representation corresponding to the feature identifier to the card-based collaborative workflow management user interface.

2. The apparatus of claim 1, wherein the feature release data comprises a feature release threshold and a feature release expiration threshold for each feature corresponding to the one or more feature identifiers.

3. The apparatus of claim 2, wherein determining the feature emphasis value for each feature identifier of the one or more feature identifiers comprises:

determining whether the user system initiation timestamp satisfies the feature release threshold;

determining whether the current timestamp satisfies the feature release expiration threshold; and determining whether the user feature engagement value satisfies a feature engagement threshold.

4. The apparatus of claim 3, wherein the feature emphasis value satisfies the display feature threshold in an instance wherein the user system initiation timestamp satisfies the feature release threshold, the current timestamp satisfies the feature release expiration threshold, and the user feature engagement value satisfies the feature engagement threshold.

5. The apparatus of claim 3, wherein the feature emphasis value fails to satisfy the display feature threshold in an instance wherein the user system initiation timestamp fails to satisfy the feature release threshold, the current timestamp fails to satisfy the feature release expiration threshold, and/or the user feature engagement value fails to satisfy the feature engagement threshold.

6. The apparatus of claim 3, wherein the user system initiation timestamp satisfies the feature release threshold in an instance wherein the user system initiation timestamp antedates the feature release threshold.

7. The apparatus of claim 3, wherein the user system initiation timestamp fails to satisfy the feature release threshold in an instance wherein the user system initiation timestamp postdates the feature release threshold.

8. The apparatus of claim 3, wherein the current timestamp satisfies the feature release expiration threshold in an instance wherein the current timestamp antedates the feature release expiration threshold.

9. The apparatus of claim 3, wherein the current timestamp fails to satisfy the feature release expiration threshold in an instance wherein the current timestamp postdates the feature release expiration threshold.

10. The apparatus of claim 3, wherein the user feature engagement value satisfies the feature engagement threshold in an instance wherein a user activity data log documenting user engagement with a selected feature does not comprise a data entry identifying an explicit feature engagement signal stored in association with the feature identifier and the user identifier.

11. The apparatus of claim 3, wherein the user feature engagement value fails to satisfy the feature engagement threshold in an instance wherein a user activity data log documenting user engagement with a selected feature comprises at least one data entry identifying one or more explicit feature engagement signals stored in association with the feature identifier and the user identifier.

12. The apparatus of claim 3, wherein the user feature engagement value satisfies the feature engagement threshold in an instance wherein a user activity data log documenting user engagement with a selected feature comprises at least one data entry identifying one or more implicit feature engagement signals stored in association with the feature identifier, the user identifier, and a session identifier associated with a current user session.

13. The apparatus of claim 3, wherein the user feature engagement value fails to satisfy the feature engagement threshold in an instance wherein a user activity data log documenting user engagement with the feature comprises one or more implicit feature engagement signals stored in association with the feature identifier, the user identifier, and a session identifier, wherein the session identifier is associated with a user session that differs from a current user session.

14. The apparatus of claim 1, wherein the computer-coded instructions are further configured to, in execution with the at least one processor, cause the apparatus to:

monitor user interaction with the card-based collaborative workflow management user interface;

identify an explicit feature engagement signal, the explicit feature engagement signal comprising a first feature identifier of the one or more feature identifiers;

automatically update the card-based collaborative workflow management user interface to remove the feature emphasis interface element associated with the feature interface representation corresponding to the first feature identifier; and cause storage of an updated user feature engagement value associated with the user identifier and the first feature identifier in the user data repository.

15. The apparatus of claim 1, wherein the display feature threshold is dynamically determined based on a machine learning model.

16. A computer-implemented method for managing a feature emphasis interface element in association with a card-based collaborative workflow management system, the computer-implemented method comprising:

receiving a feature status request comprising a user identifier and one or more feature identifiers, wherein the feature status request comprises a request for a status of one or more features of the card-based collaborative workflow management system with respect to a particular user, the one or more features corresponding to the respective one or more feature identifiers and the particular user corresponding to the user identifier;

retrieving feature release data associated with each of the one or more feature identifiers from a feature release data repository;

retrieving user data associated with the user identifier from a user data repository, wherein the user data comprises at least a user system initiation timestamp and a user feature engagement value for each feature identifier of the one or more feature identifiers;

for each feature identifier of the one or more feature identifiers, determining a feature emphasis value based at least in part on the user system initiation timestamp, a current timestamp, and the user feature engagement value;

for each instance wherein the feature emphasis value satisfies a display feature threshold, rendering a feature emphasis interface element to a card-based collaborative workflow management user interface in association with a feature interface representation corresponding to the feature identifier.

17. The computer-implemented method of claim 16 further comprising:

for each instance wherein the feature emphasis value fails to satisfy the display feature threshold, rendering the feature interface representation corresponding to the feature identifier to the card-based collaborative workflow management user interface.

18. The computer-implemented method of claim 17, wherein the feature release data comprises a feature release threshold and a feature release expiration threshold for each feature corresponding to the one or more feature identifiers.

19. The computer-implemented method of claim 18, wherein determining the feature emphasis value for each feature identifier of the one or more feature identifiers comprises:

determining whether the user system initiation timestamp satisfies the feature release threshold;

determining whether the current timestamp satisfies the feature release expiration threshold; and determining whether the user feature engagement value satisfies a feature engagement threshold.

20. The computer-implemented method of claim 19, wherein the feature emphasis value satisfies the display feature threshold in an instance wherein the user system initiation timestamp satisfies the feature release threshold, the current timestamp satisfies the feature release expiration threshold, and the user feature engagement value satisfies the feature engagement threshold.

21. The computer-implemented method of claim 19, wherein the feature emphasis value fails to satisfy the display feature threshold in an instance wherein the user system initiation timestamp fails to satisfy the feature release threshold, the current timestamp fails to satisfy the feature release expiration threshold, and/or the user feature engagement value fails to satisfy the feature engagement threshold.

22. The computer-implemented method of claim 19, wherein the user system initiation timestamp satisfies the feature release threshold in an instance wherein the user system initiation timestamp antedates the feature release threshold.

23. The computer-implemented method of claim 19, wherein the user system initiation timestamp fails to satisfy the feature release threshold in an instance wherein the user system initiation timestamp postdates the feature release threshold.

24. The computer-implemented method of claim 19, wherein the current timestamp satisfies the feature release expiration threshold in an instance wherein the current timestamp antedates the feature release expiration threshold.

25. The computer-implemented method of claim 19, wherein the current timestamp fails to satisfy the feature release expiration threshold in an instance wherein the current timestamp postdates the feature release expiration threshold.

26. The computer-implemented method of claim 19, wherein the user feature engagement value satisfies the feature engagement threshold in an instance wherein a user activity data log documenting user engagement with a selected feature does not comprise a data entry identifying an explicit feature engagement signal stored in association with the feature identifier and the user identifier.

27. The computer-implemented method of claim 19, wherein the user feature engagement value fails to satisfy the feature engagement threshold in an instance wherein a user activity data log documenting user engagement with a selected feature comprises at least one data entry identifying one or more explicit feature engagement signals stored in association with the feature identifier and the user identifier.

28. The computer-implemented method of claim 19, wherein the user feature engagement value satisfies the feature engagement threshold in an instance wherein a user activity data log documenting user engagement with a selected feature comprises at least one data entry identifying one or more implicit feature engagement signals stored in association with the feature identifier, the user identifier, and a session identifier associated with a current user session.

29. The computer-implemented method of claim 19, wherein the user feature engagement value fails to satisfy the feature engagement threshold in an instance wherein a user activity data log documenting user engagement with a selected feature comprises one or more implicit feature engagement signals stored in association with the feature identifier, the user identifier, and a session identifier, wherein the session identifier is associated with a user session that differs from a current user session.

30. The computer-implemented method of claim 16, further comprising:

monitoring user interaction with the card-based collaborative workflow management user interface;

identifying an explicit feature engagement signal, the explicit feature engagement signal comprising a first feature identifier of the one or more feature identifiers;

automatically updating the card-based collaborative workflow management user interface to remove the feature emphasis interface element associated with the feature interface representation corresponding to the first feature identifier; and storing an updated user feature engagement value associated with the user identifier and the first feature identifier in the user data repository.

* * * * *